United States Patent
Kawasaki et al.

(10) Patent No.: US 11,567,716 B2
(45) Date of Patent: Jan. 31, 2023

(54) INFORMATION PROCESSING SYSTEM, INFORMATION PROCESSING METHOD, AND INFORMATION PROCESSING APPARATUS

(71) Applicants: Hajime Kawasaki, Chiba (JP); Makoto Aoki, Tokyo (JP)

(72) Inventors: Hajime Kawasaki, Chiba (JP); Makoto Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

(21) Appl. No.: 17/199,640

(22) Filed: Mar. 12, 2021

(65) Prior Publication Data
US 2021/0294548 A1 Sep. 23, 2021

(30) Foreign Application Priority Data

Mar. 17, 2020 (JP) .............................. JP2020-046999
Dec. 28, 2020 (JP) .............................. JP2020-218537

(51) Int. Cl.
*G06F 3/12* (2006.01)
*H04N 1/32* (2006.01)

(52) U.S. Cl.
CPC .......... *G06F 3/1257* (2013.01); *G06F 3/1208* (2013.01); *G06F 3/1243* (2013.01);
(Continued)

(58) Field of Classification Search
CPC .... G06F 3/1257; G06F 3/1208; G06F 3/1243; G06F 3/1256; G06F 3/1275; G06F 3/1285; G06F 3/1204; H04N 1/3255
(Continued)

(56) References Cited

U.S. PATENT DOCUMENTS

2004/0190057 A1* 9/2004 Takahashi ............. G06F 3/1205
358/1.15
2009/0244584 A1* 10/2009 McGarry ............. G06F 3/1257
358/1.13
(Continued)

FOREIGN PATENT DOCUMENTS

EP 1710686 10/2006
JP 2005-100298 4/2005
(Continued)

OTHER PUBLICATIONS

Extended European Search Report for EP21162592.6 dated Jul. 29, 2021.

*Primary Examiner* — Darryl V Dottin
(74) *Attorney, Agent, or Firm* — IPUSA, PLLC

(57) ABSTRACT

An information processing system includes a printing device and a processor. The processor is programmed to generate image data of a first form including a predetermined area having a predetermined color that is associated with one or more parts constituting a final product of a job identified by the first form, generate image data of one or more second forms that inherit the predetermined color of the predetermined area from the first form, instruct the printing device to print the first form and the one or more second forms using the image data of the first form and the one or more second forms, and manage the job identified by the first form and the one or more second forms by using the predetermined color of the predetermined area of the first form and the one or more second forms.

17 Claims, 23 Drawing Sheets

(52) U.S. Cl.
CPC ......... *G06F 3/1256* (2013.01); *H04N 1/3255* (2013.01); *G06F 3/1204* (2013.01)

(58) Field of Classification Search
USPC ......................................................... 358/1.9
See application file for complete search history.

(56) References Cited

U.S. PATENT DOCUMENTS

2020/0034592 A1* 1/2020 Kawasaki ............ G06K 7/1443
2020/0293239 A1   9/2020 Kawasaki et al.

FOREIGN PATENT DOCUMENTS

JP          2017-199306         11/2017
JP          2020-021181          2/2020

* cited by examiner

FIG.2B
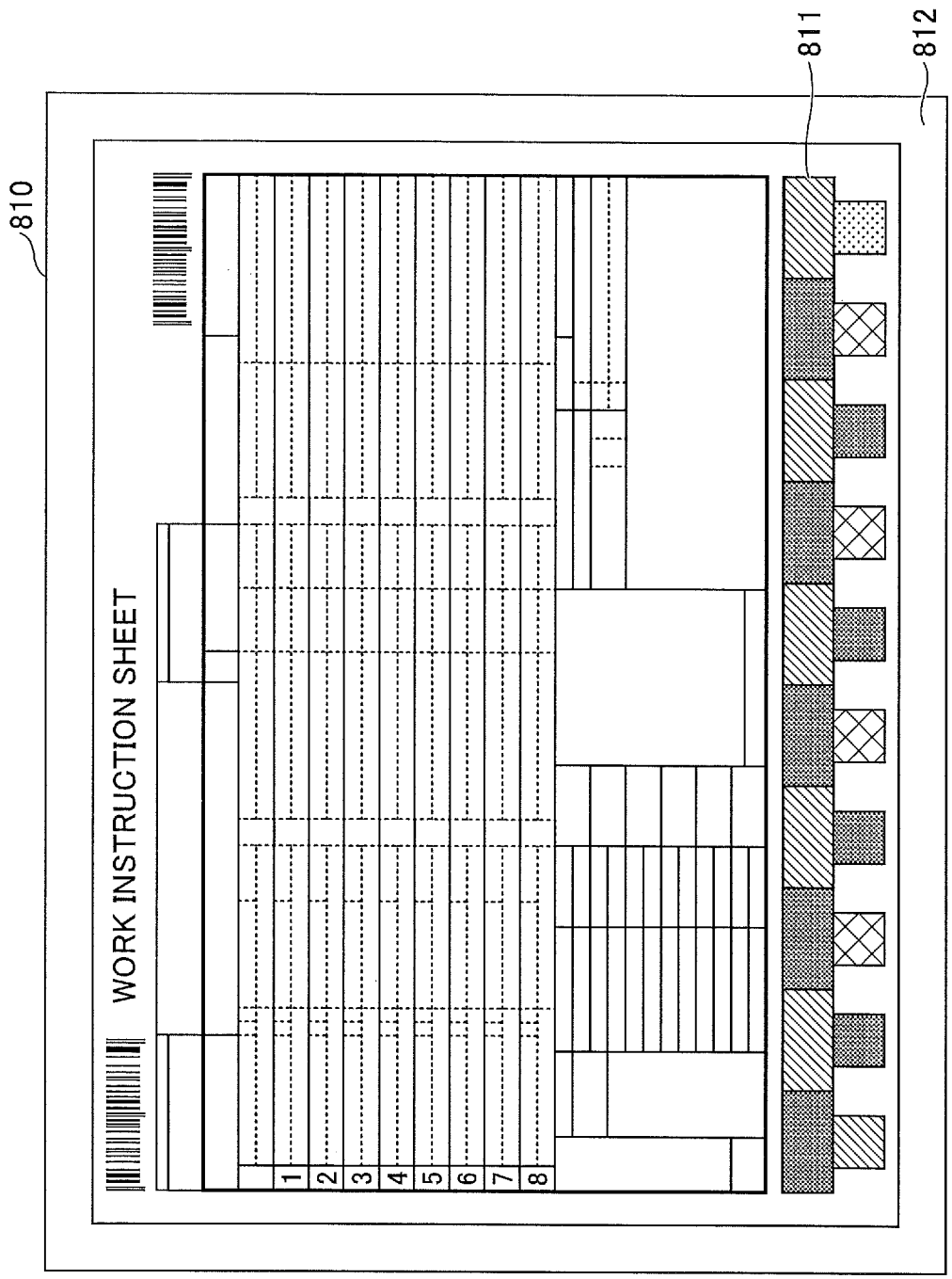
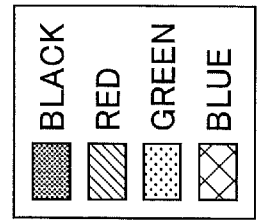

FIG.8A
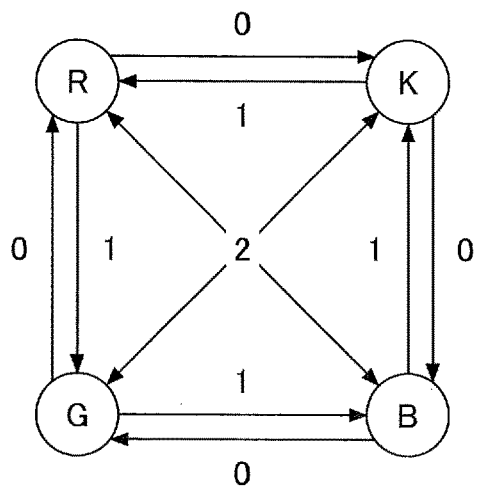
FIG.8B
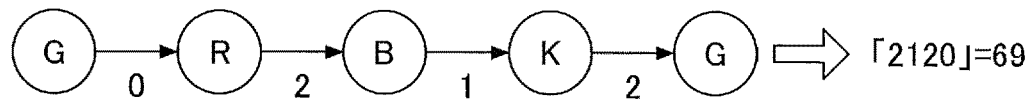
⌈2120⌋=69
FIG.8C
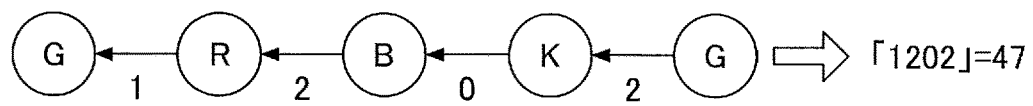
⌈1202⌋=47
FIG.8D
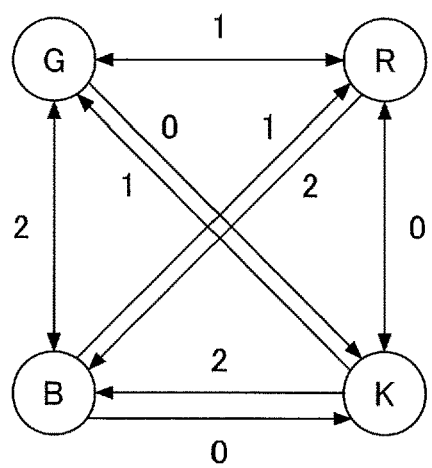
FIG.8E
|   | 0 | 1 | 2 |
|---|---|---|---|
| R | K | G | B |
| G | K | R | B |
| B | K | R | G |
| K | R | G | B |

JOB LIST — Live Location

| | JOB ID | LABEL NAME | BRANCH NO. | LAST UPDATED ▼ | GATE (1) | GATE (2) | GATE (3) | STORAGE (1) ▼ | GATE (4) | GATE (5) | STORAGE (2) |
|---|---|---|---|---|---|---|---|---|---|---|---|
| ⊟ | ABCDE | ... | ... | 2018/3/10 14:45:20 | ● | ● | ● | ◎ | ● | ● | ○ |
| | ABCDE | COVER | 00 | 2018/3/10 10:23:40 | ● | ● | ● | ◎ | ○ | ● | ○ |
| | ABCDE | COVER | 01 | 2018/3/10 10:23:40 | ● | ○ | ○ | ◎ | ○ | ○ | ○ |
| | ABCDE | BODY | 00 | 2018/3/10 14:45:20 | ● | ● | ○ | ◎ | ● | ○ | ○ |
| | ABCDE | BODY | 01 | 2018/3/10 14:45:20 | ● | ● | ○ | ◎ | ● | ○ | ○ |
| | ABCDE | BODY | 02 | 2018/3/10 14:45:20 | ● | ○ | ◎ | ● | ● | ○ | × |
| | ABCDE | BODY | 03 | 2018/3/10 14:45:20 | ○ | ○ | ◎ | ● | ● | ○ | ● |
| ⊞ | CCC | ... | ... | 2018/3/10 14:45:20 | ● | ○ | ● | ○ | ● | ○ | × |
| ⊞ | DDD | ... | ... | 2018/3/10 14:45:20 | | | | | | | |

[MAP VIEW] [UPDATE]

| JOB ID | COLOR CODE ID | STATES OF WORK PROCESSES ||||
| --- | --- | --- | --- | --- | --- |
| | | PRINTING | CUTTING | FOLDING | BINDING | INSPECTION |
| A | AA | COMPLETED | COMPLETED | COMPLETED | COMPLETED | |
| B | BB | COMPLETED | COMPLETED | | | |
| C | CC | COMPLETED | | | | |
| D | DD | COMPLETED | COMPLETED | COMPLETED | | |
| E | EE | COMPLETED | COMPLETED | COMPLETED | | |
| F | FF | | | | | |

FIG.22

| CAMERA | STATES OF WORK PROCESSES |
|---|---|
| CAMERA 18a1 | PRINTING |
| CAMERA 18a2 | CUTTING |
| CAMERA 18a3 | FOLDING |
| CAMERA 18a4 | BINDING |
| CAMERA 18a5 | INSPECTING |
| CAMERA 18b1 | PRINTING COMPLETED |
| CAMERA 18b2 | FOLDING COMPLETED |

INFORMATION PROCESSING SYSTEM, INFORMATION PROCESSING METHOD, AND INFORMATION PROCESSING APPARATUS

CROSS-REFERENCE TO RELATED APPLICATIONS

The present application claims priority under 35 U.S.C. § 119 to Japanese Patent Application No. 2020-046999, filed on Mar. 17, 2020 and Japanese Patent Application No. 2020-218537, filed on Dec. 28, 2020. The contents of which are incorporated herein by reference in their entirety.

BACKGROUND OF THE INVENTION

1. Field of the Invention

An aspect of this disclosure relates to an information processing system, an information processing method, and an information processing apparatus.

2. Description of the Related Art

There is a known method where the progress of a job including multiple work processes is managed by using, for example, a barcode printed on a work instruction sheet.

Also, for example, Japanese Unexamined Patent Application Publication No. 2005-100298 describes a system where RFID tags are attached to workers and work objects (e.g., materials, in-process items, and products in a factory), and the work time of the workers and the flow (entry and exit into and from a work place) of the work objects are managed by reading the RFID tags at the entrance gate at the entrance of a processing plant and the exit gate at the exit of the processing plant.

With related-art technology where the progress of a job including multiple work processes for generating a final product is managed by identifying the job using, for example, a barcode printed on a work instruction sheet, when the job needs to be divided into multiple jobs for management because the number of products or parts produced in a given work process is increased to produce the final product, it is difficult to accurately manage the original job (which is hereafter referred to as a parent job) and separated jobs (which are hereafter referred to as child jobs). For example, there is no mechanism that can manage the storage locations of products produced by the parent job and the child jobs obtained by dividing the parent job during the production process and can manage the progress of multiple parent jobs and child jobs as well as the entire job in detail.

SUMMARY OF THE INVENTION

According to an aspect of this disclosure, there is provided an information processing system that includes a printing device and a processor. The processor is programmed to generate image data of a first form including a predetermined area having a predetermined color that is associated with one or more parts constituting a final product of a job identified by the first form, generate image data of one or more second forms that inherit the predetermined color of the predetermined area from the first form, instruct the printing device to print the first form and the one or more second forms using the image data of the first form and the one or more second forms, and manage the job identified by the first form and the one or more second forms by using the predetermined color of the predetermined area of the first form and the one or more second forms.

BRIEF DESCRIPTION OF THE DRAWINGS

FIGS. 2A and 2B are drawings illustrating examples of work instruction sheets used in the job management system of the embodiment;

FIGS. 8A through 8E are drawings for explaining coding rules that can express a ternary number;

FIG. 16 is a drawing illustrating an example of a UI screen displayed by a work process management system;

FIG. 21 is an example of a Table T1 where job IDs, color code IDs, and job information are associated with each other;

FIG. 22 is an example of a table T2 where camera identifiers and states of work processes are associated with each other.

DESCRIPTION OF THE EMBODIMENTS

An aspect of this disclosure makes it possible to provide an information processing system that can finely manage a job divided into multiple jobs by using forms generated for the jobs.

Embodiments of the present invention are described below with reference to the accompanying drawings. The embodiments are described using, as an example, a job management system that manages work processes of a job in a printing factory using a work instruction sheet (form). A job in a printing factory indicates a series of work processes such as printing, cutting, folding, binding, and inspection performed by a printing company using a system, a printer connected to the system, and other devices and instruments to produce final products and provide the final products to a client. A final product may be, for example, a printed material including multiple parts (or constituted by multiple parts) and provided by a printing company to a client (e.g., a company such as a publishing company or a trading company) who ordered printing. Examples of printed materials include a book, a booklet, a brochure, and a bundle of printed materials. Also, printed materials such as direct mail, a payment form, and a leaflet consisting of only one part may be included in management targets of the system. Jobs are not limited to work related to printing and may also be work for producing other types of products. Therefore, the present invention is not limited to a job management system for managing work processes of a job in a printing factory. The present invention may be applied to various types of management systems for managing processes in production and manufacturing.

First Embodiment

<System Configuration>

Figure 1:
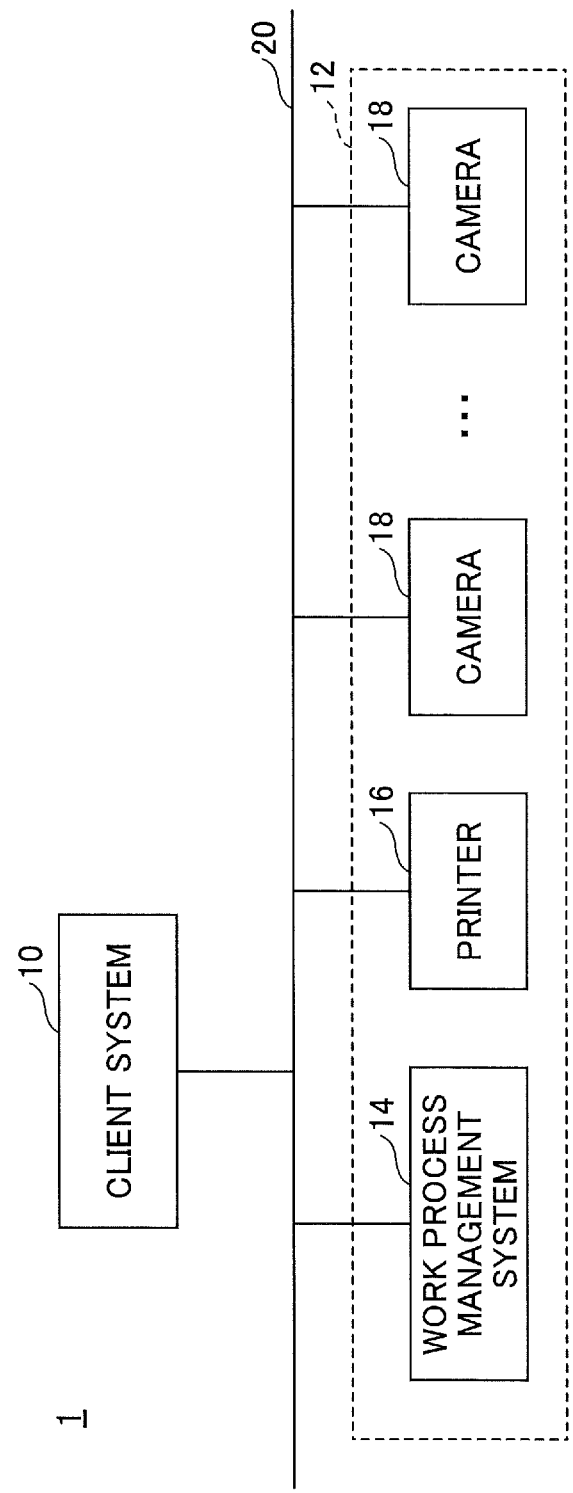
FIG. 1 is a drawing illustrating an example of a configuration of a job management system according to an embodiment.
Figure 2A:
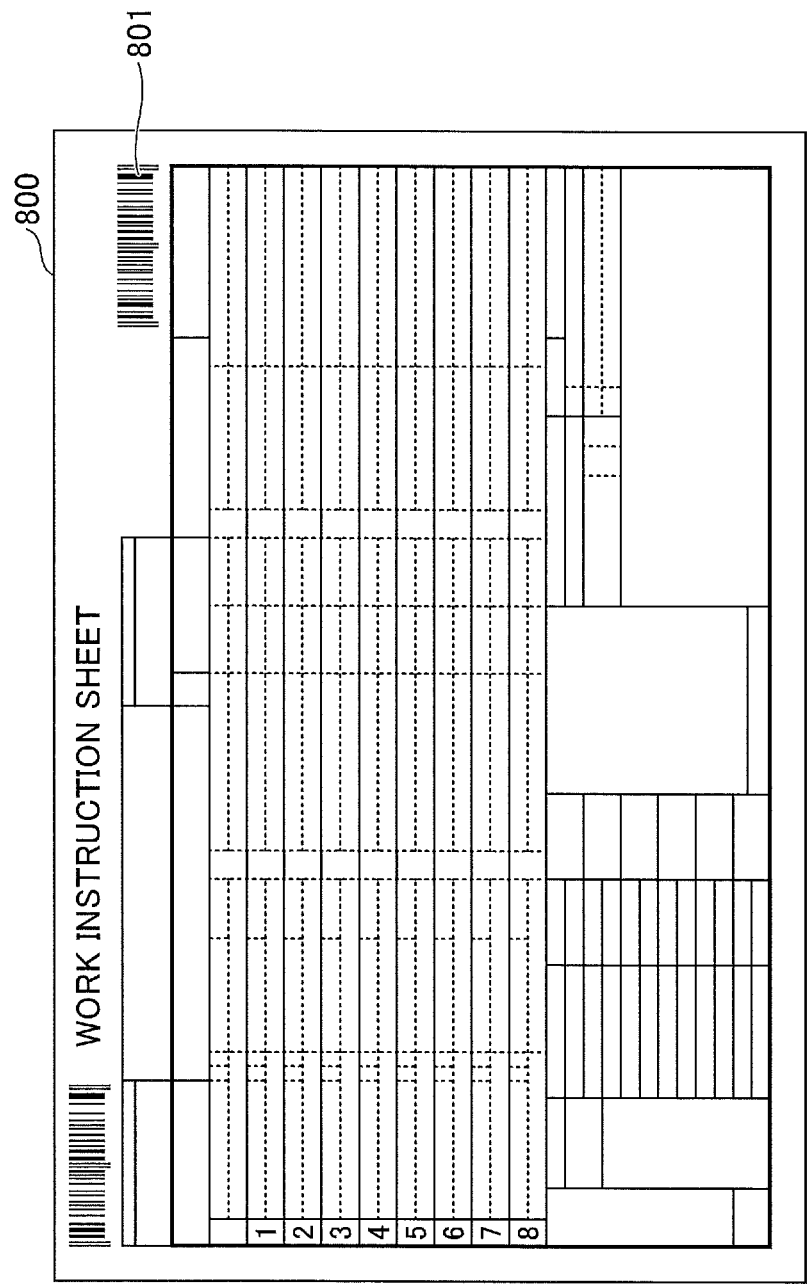

FIG. 1 is a drawing illustrating an example of a configuration of a job management system according to a first embodiment. FIGS. 2A and 2B are drawings illustrating examples of work instruction sheets used in the job management system of the first embodiment. A job management system 1 illustrated in FIG. 1 includes a client system 10, a work process management system 14, a printer 16, and one or more cameras 18 that are connected to each other via a network 20 such as the Internet or a LAN to enable data communications.

The client system 10 is an example of a system introduced and used by, for example, a printing company, which may be a client of a company that provides printers and management systems, and generates a work instruction sheet 800 for the client system 10. As illustrated in FIG. 2A, the work instruction sheet 800 includes a job ID. The work instruction sheet 800 is a document that describes the contents of work processes included in a job for producing a final product and is generated as an electronic file by the client system 10. The work instruction sheet 800 may be used in the form of a printed material. The work instruction sheet 800 describes details of work processes and equipment used in the work processes. For example, the work instruction sheet 800 describes parts that are necessary to produce a final product and how the parts are generated and assembled. "Parts" indicate components (intermediate products) constituting a final product. Examples of parts include a hard cover of a book, a cover that further covers the hard cover, a body, a foldout, a small-sized page, and a leaflet to be inserted. Therefore, branched jobs for making parts, i.e., child jobs, are generated by dividing a job (parent job). The job ID is an example of identification information for identifying a job and is issued by, for example, the client system 10. The work instruction sheet 800 for the client system 10 illustrated in FIG. 2A includes a barcode image 801 that is generated based on the job ID and added to the image of the work instruction sheet 800 at the client system 10. Job IDs of respective jobs are managed by the client system 10 in association with work instruction sheets 800. For example, when a worker (e.g., a printing company) operates a terminal device to newly generate a work instruction sheet 800 for the client system 10, a job ID may be automatically issued and a barcode image 801 including the job ID may be added to the image of the work instruction sheet 800.

The job ID may be indicated by the barcode image 801 or by text on the work instruction sheet 800 for the client system 10. The client system 10 provides functions implemented by the work instruction sheet 800 for the client system 10 to a worker (e.g., a printing company) that is an example of a user. Examples of the functions may include generation, editing, and print instruction of the work instruction sheet 800, issuance of the job ID, and addition of a barcode. The work instruction sheet 800 may also enable managing whether a job identified by the work instruction sheet 800 has been completed.

The work process management system 14, the printer 16, and one or more cameras 18 constitute an information processing system 12 that adds new functions to the work instruction sheet 800. The work process management system 14 manages the progress of a job including multiple work processes by using a work instruction sheet 810 for the information processing system 12. As illustrated in FIG. 2B, the work instruction sheet 810 includes a color code image 811.

The work instruction sheet 810 for the information processing system 12 illustrated in FIG. 2B is rimmed with a colored peripheral part 812. Hereafter, the color of the peripheral part 812 is referred to as a border color. With the work instruction sheet 810 rimmed with the peripheral part 812 having the border color, the boundary between the work instruction sheet 810 and an item (e.g., a printed material) placed under the work instruction sheet 810 becomes clear and the visibility of the work instruction sheet 810 increases. For example, when a work instruction sheet 810 having a size smaller than a printed material and having a white background is placed on the printed material or a bundle of parts, it may be difficult to distinguish the work instruction sheet 810 from the printed material with a white background. The border color of the work instruction sheet 810 increases the accuracy of recognizing the work instruction sheet 810 based on an image captured by the camera 18 and improves the visibility of the work instruction sheet 810 on a printed material. The work instruction sheet 810 may be covered by, for example, transparent vinyl or may be used in the form of an uncovered paper sheet. The work instruction sheet 810 may be placed on or attached to the upper side, the lateral side, or the vicinity of a printed material, parts constituting a final product, or a bundle of printed materials such that the work instruction sheet 810 can be captured by the camera 18. For example, there are many intermediate products such as parts and printed materials in a factory, and the number of parts may increase and decrease even in a single job. Also, the parts need to be moved among storage locations and need to be bound to form final products. Accordingly, it is bothersome to visually search for such parts and to manage jobs. Using border colors makes it easier for a worker to find parts at the work site, makes it easier to distinguish multiple parts necessary for a final product of a job from parts used for other jobs, and also makes it easier to find parts of the same type on which work (e.g., cutting, folding, or transporting) common to multiple jobs needs to be performed.

In the example of FIG. 2B, the entire peripheral part 812 of the work instruction sheet 810 is colored with a border color. However, only portions (e.g., one or two sides) of the peripheral part 812 may be colored with the border color. The shape and size of the peripheral part 812 in FIG. 2B are examples. Also, instead of being rimmed with the peripheral part 812 having a border color, the work instruction sheet 810 for the information processing system 12 may include a mark displayed/printed in a predetermined color. Further, instead of being rimmed with the peripheral part 812 having a border color, the work instruction sheet 810 for the information processing system 12 may include characters displayed/printed in a predetermined color.

As described later, the information processing system 12 can identify a job ID and a branch number from the color code image 811. Also, as described later, the information processing system 12 includes, in addition to the function to rim the work instruction sheet 810 with the peripheral part 812 having a border color (an example of a predetermined color), a label function that uses the border color as a label for easily identifying and visually recognizing a part included in a final product. Different colors are used as labels for respective parts included in a job. Also, different label colors may be used for respective child jobs branching from a parent job corresponding to a part, or the same label color may be used for all parts included in a job. Further, the information processing system 12 may use the color of a mark or the color of characters on the work instruction sheet 810 as a label. The color of the mark (mark color) and the color of the characters (character color) are also examples of predetermined colors.

The information processing system 12 uses the border color, the mark color, or the character color of the work instruction sheet 810 as a label, and associates the border color, the mark color, or the character color with the contents of a job (e.g., the type of a work object of the job) to enable the worker to visually and intuitively recognize the contents of the job.

Also, the information processing system 12 may use border colors, mark colors, or character colors of work instruction sheets 810 as labels to identify the work instruction sheets 810 for a "cover" job and a "body" job included in a "binding" job based on the label colors. For example, the information processing system 12 sets the label color of the work instruction sheet 810 for the "cover" job to orange. Also, the information processing system 12 may set the label color of the work instruction sheet 810 for the "body" job to yellow. Thus, the information processing system 12 may assign similar label colors to parts included in a job by changing the RGB values within a predetermined range. For example, the information processing system 12 may obtain similar colors by changing one or more of the RGB values of yellow (R: 255, G: 255, B: 0; #ffff00) or orange (R: 255 G: 128 B: 0; #ff8000) within a predetermined range (e.g., any value within 150) and assign the obtained colors to parts so that it is easily recognizable that the parts are included in the same job.

When, for example, it becomes necessary to increase the number of cargo platforms or transportation equipment such as pallets for carrying or transporting work objects such as bundles of printed materials or job parts in the middle of a job, the information processing system 12 issues a work instruction sheet 810 for a job (child job) that inherits the label color of the work instruction sheet 810 of the job (parent job). The parent job is an example of a first form. The child job is an example of a second form. The number of pallets needs to be increased when, for example, the number of parts exceeds the capacity of one pallet and the same type of parts need to be separated and loaded on multiple pallets because the number of prints (production quantity) of the parts is large or the volume of the parts has increased as a result of cutting and folding. Also, there is a case where another type of part needs to be added. For example, the number of types of parts used in a job may increase when an additional page such as an advertisement page needs to be inserted in a booklet. The work instruction sheet 810 of the child job inherits the job ID and the label color of the work instruction sheet 810 of the parent job. "Inherit" means that when the work instruction sheet 810 of the child job is generated and printed, the branch number of the child job is automatically issued using the job ID and the label color of the parent job and is stored in association with the job ID. The work instruction sheets 810 for parent jobs and child jobs are managed individually using a job ID and different branch numbers for respective parent jobs and child jobs.

Using a job ID, label colors, and branch numbers makes it possible to easily manage parent jobs and child jobs branching from the parent jobs. Accordingly, using the work instruction sheets 810 for the parent jobs and the child jobs identified by the job ID, the label colors, and the branch numbers makes it possible to recognize the existence of different types of parts generated by the parent jobs and the child jobs and the locations where the different types of parts are placed, and makes it easier to manage the parts and the progress of the entire job. Also, even when the number of pallets used for a job is increased and the parts are stored in various locations, this configuration makes it easier to find the locations of the parts and makes it easier for the worker to perform the next work. In the example described below, the border colors of work instruction sheets 810 are used as labels. However, the colors of marks or characters of work instruction sheets 810 may instead be used as labels.

The printer 16 prints the work instruction sheet 810 for the information processing system 12. The cameras 18 are installed to be able to capture images of locations in the printing factory corresponding to the work processes in a job. The locations corresponding to job work processes indicate, for example, locations that a printed material passes through when being moved between work process locations and temporary storage locations where the printed material is temporarily stored.

The cameras 18 may be implemented by PTZ cameras and/or IP cameras. The PTZ camera includes pan, tilt, and zoom (PTZ) functions that can be controlled via the network 20 and can transmit captured images and captured videos via the network 20.

The IP camera can be operated via the network 20 and can transmit captured images and captured videos via the network 20. Images and videos captured by the cameras 18 are transmitted via the network 20 to the work process management system 14.

In the information processing system 12 that generates and prints the work instruction sheet 810 obtained by adding new functions to the work instruction sheet 800, the work instruction sheet 810 for the information processing system 12 is placed on or attached to a work object (a printed material that is an example of an intermediate product, a part, or a material) of a job corresponding to the work instruction sheet 810. Also, the work instruction sheet 810 for the information processing system 12 may be placed on or attached to a cargo platform such as a pallet that carries the work object of the job. The work instruction sheet 810 is placed on or attached to a work object such as a printed material or a pallet on which the work object is placed at such a position that the work instruction sheet 810 can be correctly captured by the camera 18.

The work process management system 14 manages the progress (job status) of work processes of parent jobs and child jobs branching from the parent jobs based on job work processes corresponding to the cameras 18 capturing the work instruction sheets 810 and job IDs, label colors, and branch numbers identified from the work instruction sheets 810. Also, the work process management system 14 manages the history of work processes of jobs and manages captured images and captured videos indicating states at the time when the work instruction sheets 810 are captured.

The configuration of the job management system 1 illustrated in FIG. 1 is an example. For example, the job management system 1 may also include other systems, and the work process management system 14 may have a different name. The work process management system 14 may be implemented by a single-server environment or a multi-server environment.

<Hardware Configuration>

Figure 3:
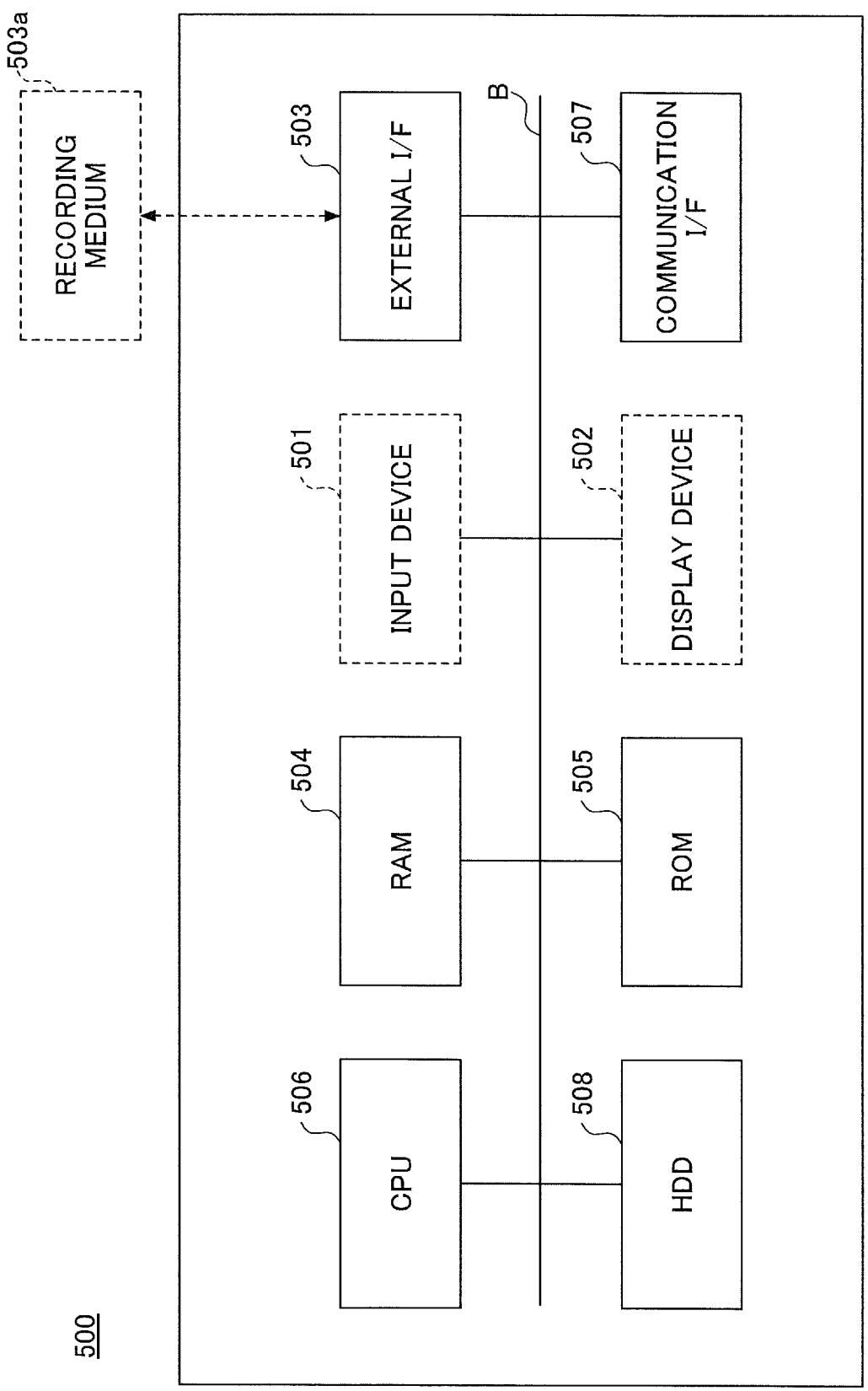
FIG. 3 is a drawing illustrating an example of a hardware configuration of a computer.

Each of the client system 10 and the work process management system 14 may be implemented by, for example, a computer 500 with a hardware configuration illustrated in FIG. 3. The computer 500 may be a terminal device such as a personal computer or may be implemented by a system including one or more server devices and a terminal device including an operation unit. Also, the computer 500 may be a server installed on-premise in a factory or a cloud server that provides the functions of the present invention as a cloud service. The client system 10 and the work process management system 14 may be applications or software installed in the computer 500 or may be functions or cloud services provided by one or more server devices connected to the computer 500 via a network.

FIG. 3 is a drawing illustrating an example of a hardware configuration of the computer 500. As illustrated in FIG. 3, the computer system 500 may include an input device 501, a display device 502, an external I/F 503, a random access memory (RAM) 504, a read-only memory (ROM) 505, a central processing unit (CPU) 506, a communication I/F 507, and a hard disk drive (HDD) 508 that are connected to each other via a bus B. The input device 501 and the display device 502 may be configured to be connected to the computer 500 when necessary.

The input device 501 includes, for example, a keyboard, a mouse, and/or a touch panel and is used by the user to input operation signals. The display device 502 displays, for example, processing results of the computer 500.

The communication I/F 507 is an interface that connects the computer 500 to various networks. The computer system 500 can perform data communications via the communication I/F 507.

The HDD 508 is an example of a non-volatile storage device for storing programs and data. For example, the HDD 508 may store basic software or an operating system (OS) for controlling the entire computer 500, and application software (which is hereafter referred to as applications) for providing various functions on the OS. The HDD 508 in the computer 500 may be replaced with another type of drive such as a solid-state drive (SSD) that uses a flash memory as a storage medium.

The external I/F 503 is an interface with an external device. A recording medium 503*a* is an example of the external device. The computer system 500 can read and write data from and to the recording medium 503*a* via the external I/F 503. Examples of the recording medium 503*a* include a flexible disk, a compact disk (CD), a digital versatile disk (DVD), a secure digital (SD) memory card, and a universal serial bus (USB) memory.

The ROM 505 is an example of a non-volatile semiconductor memory (storage device) that can retain programs and data even when power is turned off. For example, the ROM 505 stores programs and data such as a basic input/output system (BIOS) that is executed when the computer 500 is turned on, and OS and network settings of the computer 500. The RAM 504 is an example of a volatile semiconductor memory (storage device) for temporarily storing programs and data.

The CPU 506 is a processor that loads programs and data from storage devices such as the ROM 505 and the HDD 508 into the RAM 504, and executes the loaded programs to control the entire computer 500 and to implement various functions of the computer 500. The client system 10 and the work process management system 14 can perform various processes described later with the hardware configuration of the computer 500 as exemplified in FIG. 3. Descriptions of the hardware configurations of the printer 16 and the camera 18 are omitted here.

<Software Configuration>

Figure 4:
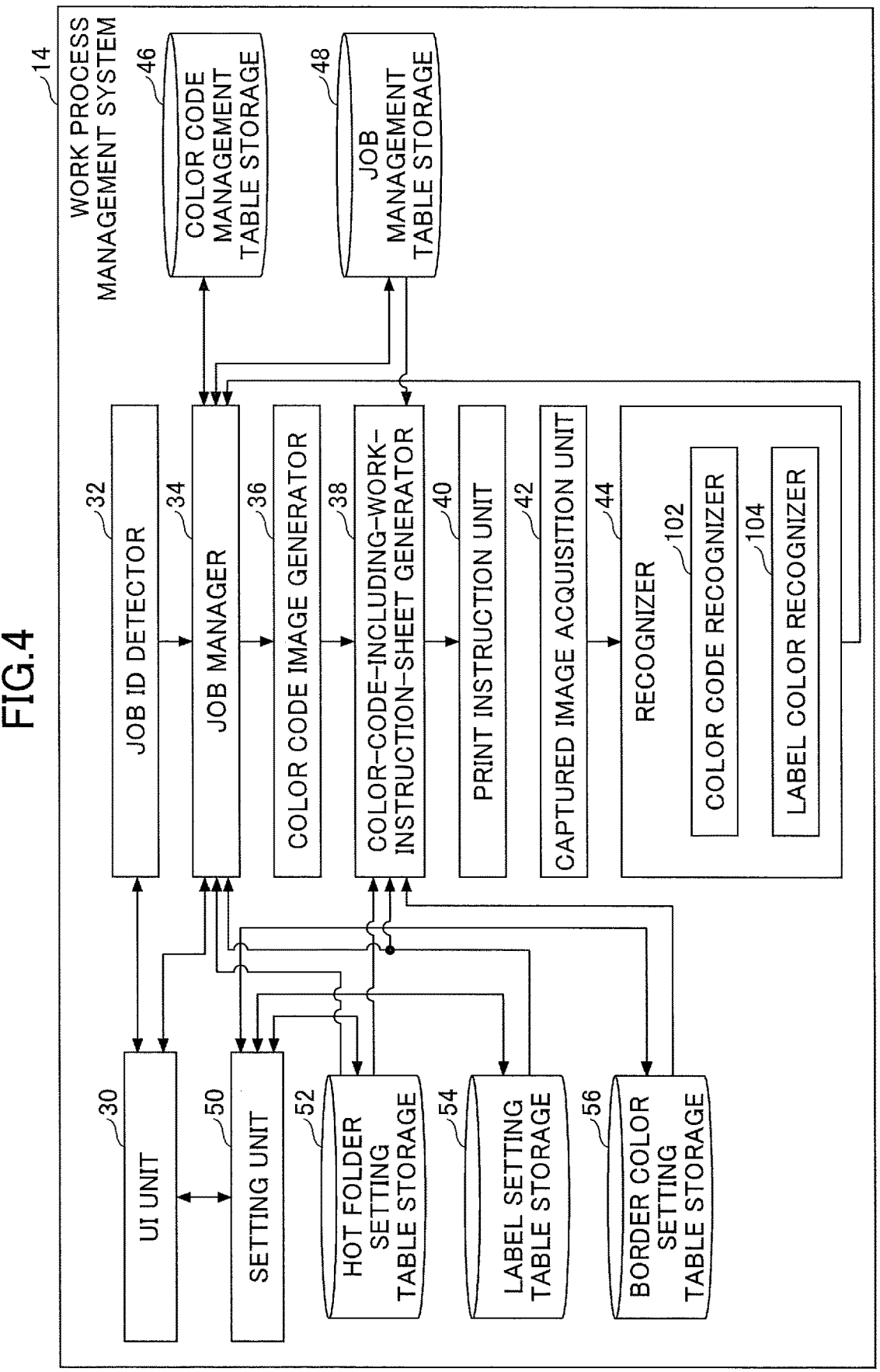
FIG. 4 is a drawing illustrating an example of a functional configuration of a work process management system.

FIG. 4 is a drawing illustrating an example of a functional configuration of the work process management system 14. In the functional configuration of FIG. 4, components not necessary for the explanation of the present embodiment are omitted. The work process management system 14 of FIG. 4 includes a user interface (UI) unit 30, a job ID detector 32, a job manager 34, a color code image generator 36, a color-code-including-work-instruction-sheet generator 38, a print instruction unit 40, a captured image acquisition unit 42, a recognizer 44, a color code management table storage 46, a job management table storage 48, a setting unit 50, a hot folder setting table storage 52, a label setting table storage 54, and a border color setting table storage 56. The recognizer 44 includes a color code recognizer 102 and a label color recognizer 104.

The UI unit 30 controls the display of various screens such as a screen for receiving various settings from the worker, a label setting screen, and a job status list screen described later. For example, the job ID detector 32 detects a job ID indicated by the barcode image 801 or text on the work instruction sheet 800 for the client system 10 illustrated in FIG. 2A. The UI unit 30 may be a unit for generating or transmitting screen information and screen components to be displayed on, for example, the display device 502 of the computer 500.

The job manager 34 stores and manages available color code IDs in the color code management table storage 46.

If no unused color code ID is left in the color code management table storage 46, the job manager 34 selects a color code ID whose last updated date is oldest from the color code management table storage 46, and reuses the selected color code ID. The job manager 34 manages the job ID and the branch number detected by the job ID detector 32 in association with the selected color code ID in the color code management table storage 46.

Also, the job manager 34 stores the job ID, the color code ID, and job information in the job management table storage 48 in association with each other. The job information includes state information that indicates states of job processes. FIG. 21 is an example of a table T1 that is stored in the job management table storage 48. In the table T1, job IDs, color code IDs, and job information are associated with each other.

Also, the job management table storage 48 stores identifiers of the cameras 18 and state information indicating the states of processes in association with each other. FIG. 22 is an example of a table T2 stored in the job management table storage 48 where the identifiers of the cameras 18 and the state information indicating the states of the processes are associated with each other.

Also, the job management table, storage 48 stores progress information and history information of work processes of jobs (parent jobs and child jobs) in association with captured image files and captured video files indicating states at the time when the work instruction sheets 810 are captured. These information items and files are used to display, for example, a job status list screen.

The color code image generator 36 generates the color code image 811 based on the color code ID provided by the job manager 34. The color-code-including-work-instruction-sheet generator 38 generates the work instruction sheet 810 for the information processing system 12 by adding the color code image 811 of FIG. 2B and the peripheral part 812 with the border color to the work instruction sheet 800 for the client system 10 illustrated in FIG. 2A. The print instruction unit 40 instructs the printer 16 to print the work instruction sheet 810 for the information processing system 12 illustrated in FIG. 2B, which includes the color code image 811 and is rimmed with the peripheral part 812 with the border color.

The captured image acquisition unit 42 acquires captured images and captured videos from the cameras 18. The color code recognizer 102 of the recognizer 44 decodes the color code ID from the color code image 811 of the work instruction sheet 810 for the information processing system 12 in a captured image or a captured video. The label color recognizer 104 of the recognizer 44 recognizes the border color of the peripheral part 812 of the work instruction sheet 810 in a captured image or a captured video.

For example, the recognizer 44 provides, to the job manager 34, identification information identifying the camera 18 that has captured the color code image 811 or the job work process, the decoded color code ID, and the recognized border color of the peripheral part 812.

The job manager 34 can identify the job ID and the branch number corresponding to the decoded color code ID by referring to the job management table storage 48, and can identify the label name corresponding to the recognized border color of the peripheral part 812 by referring to the border color setting table storage 56.

With the above configuration, the job manager 34 can update progress information (job status) of work processes of a job being managed in the job management table storage 48 based on the work process of the job corresponding to the camera 18 that has captured the color code image 811, the job ID and the branch number corresponding to the decoded color code ID, and the label name corresponding to the recognized border color of the peripheral part 812.

Thus, the newly added label function of the present embodiment that uses border colors as labels makes it possible to manage information that cannot be recognized based on a job ID, e.g., detailed information of jobs such as a "cover" job and a "body" job branching from a job such as a "binding" job.

The setting unit 50 stores information items set on a label setting screen described later in the hot folder setting table storage 52, the label setting table storage 54, and the border color setting table storage 56. The hot folder setting table storage 52 stores a hot folder setting table described later. The label setting table storage 54 stores a label setting table described later. Also, the border color setting table storage 56 stores a border color setting table described later.

<Processes>

Figure 5:
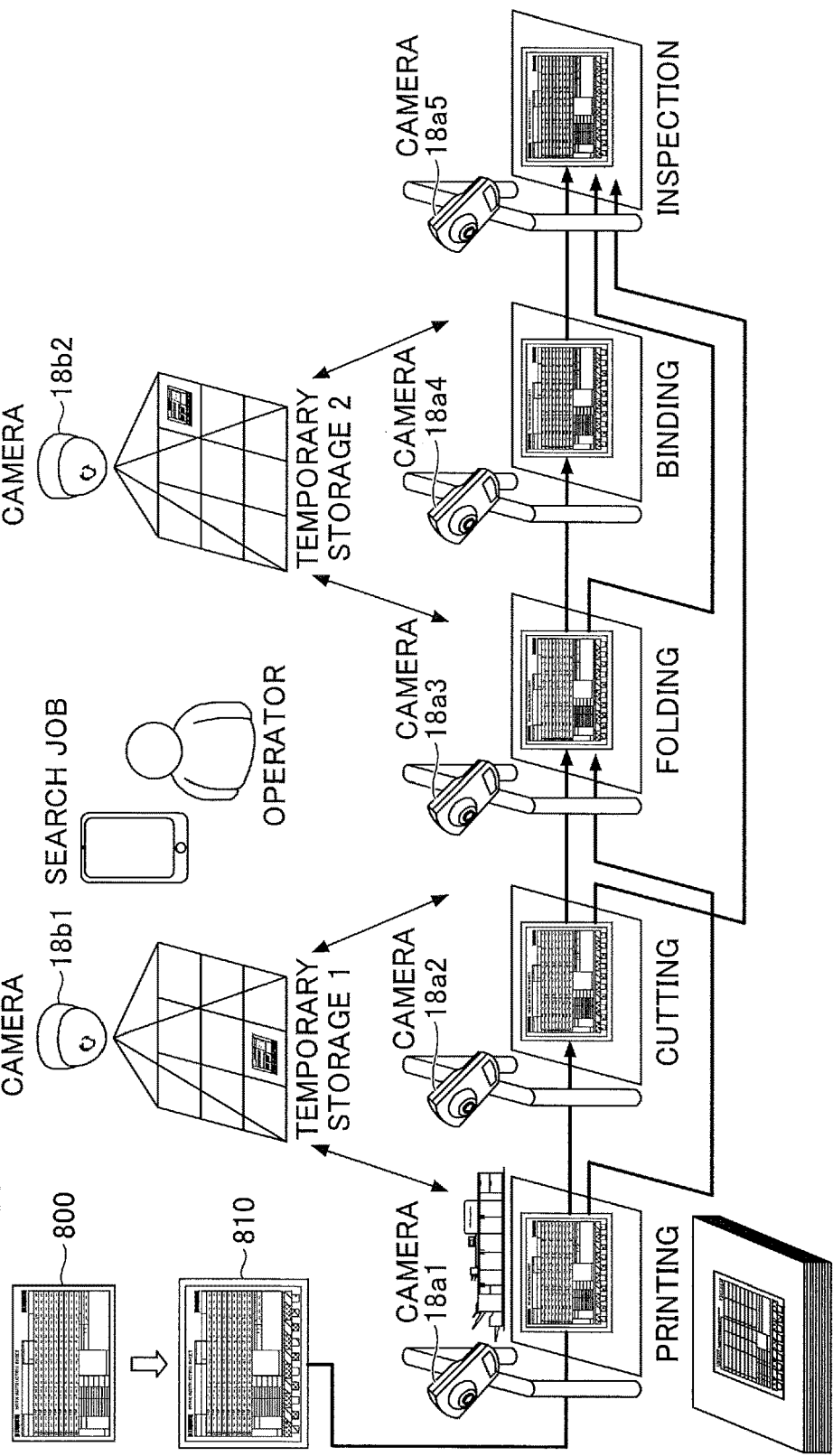
FIG. 5 is a drawing illustrating an example of work processes of a job in a printing factory.

FIG. 5 is a drawing illustrating an example of work processes of a job in a printing factory. The work processes in FIG. 5 includes "printing", "cutting", "folding", "binding", "inspection", "temporary storage 1", and "temporary storage 2". Cameras 18a1 through 18a5 are provided at the gates in front of the places where "printing", "cutting", "folding", "binding", and "inspection" are performed, respectively. Also, cameras 18b1 and 18b2 are provided in places where "temporary storage 1" and "temporary storage 2" are performed.

The work instruction sheet 810 for the information processing system 12 is captured by the cameras 18a1 through 18a5 and the cameras 18b1 and 18b2 while the work instruction sheet 810 is moved between work processes and stored in the temporary storage locations. As illustrated in FIG. 5, in the printing factory, movements of work objects among work processes may vary depending on jobs. Accordingly, a job may include a work process where the work instruction sheet 810 for the information processing system 12 is not captured, detected, and recorded. FIG. 5 includes arrows indicating the movements of a job in which all work processes are performed as well as arrows indicating the movements of jobs where some of the work processes are skipped.

In FIG. 5, after a printed material is output by the work process "printing", the work instruction sheet 810 is placed on or attached to the printed material. Accordingly, in the example of FIG. 5, the work instruction sheet 810 placed on or attached to the printed material is captured by the cameras 18a1 through 18a5 and the cameras 18b1 and 18b2 while the printed material passes through the gates and is stored in the temporary storage locations.

《Creation of Color-Code-Including Work Instruction Sheet Rimmed with Peripheral Part Having Border Color》

Figure 6:
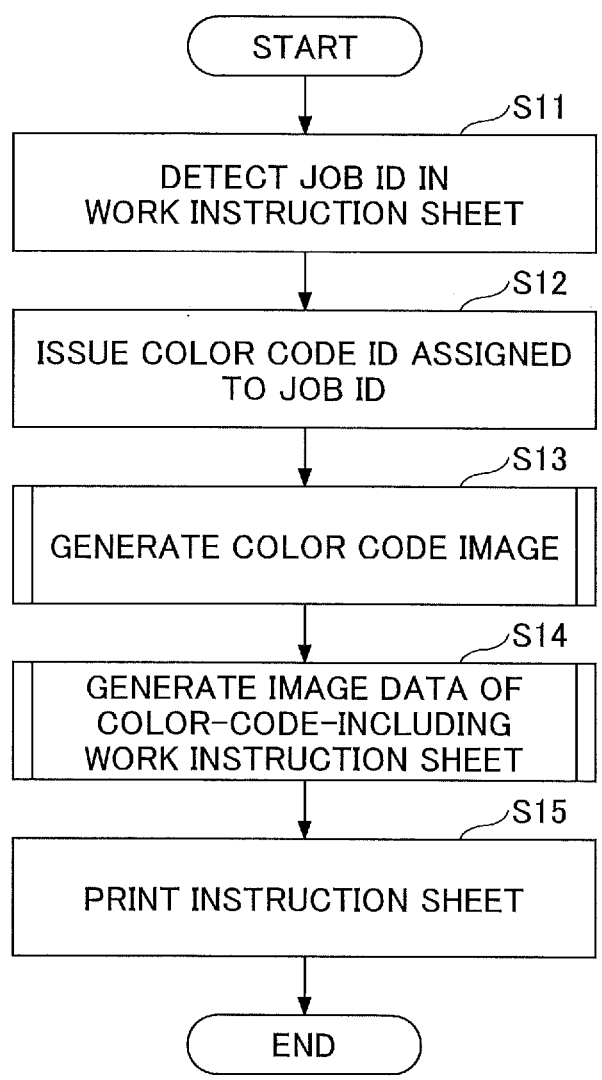
FIG. 6 is a flowchart illustrating an example of a process of generating a color-code-including work instruction sheet rimmed with a peripheral part having a border color.

FIG. 6 is a flowchart illustrating an example of a process of generating a color-code-including work instruction sheet rimmed with a peripheral part having a border color. At step S11, the job ID detector 32 of the work process management system 14 detects the job ID indicated by the barcode image 801 or text on the work instruction sheet 800 for the client system 10. For example, the computer 500 (the work process management system 14) detects the barcode image 801 or text data located in a specific position in electronic data (for example, a PDF file) of the work instruction sheet 800 generated by the client system 10 based on pixel values of images in the electronic data or by character recognition. A detection frame for detecting the job ID from the work instruction sheet 800 may be set in advance by an operator or may be automatically set by using, for example, optical character recognition (OCR).

At step S12, when the detected job ID is a new job ID, the job manager 34 selects a color code ID not being used for other job IDs from the color code management table storage 46, and stores and manages the selected color code ID, the job ID detected by the job ID detector 32, and a branch number in association with each other. If the detected job ID is not new and already exists in the color code management table storage 46, the process proceeds to step S13 using the color code ID already stored in association with the job ID. Alternatively, a message indicating that the color-code-including work instruction sheet 810 has already been printed or an error message may be displayed on the computer 500, and the current position of the already-printed color-code-including work instruction sheet 810 may be displayed in an area display screen 1300 described later.

Figure 7:
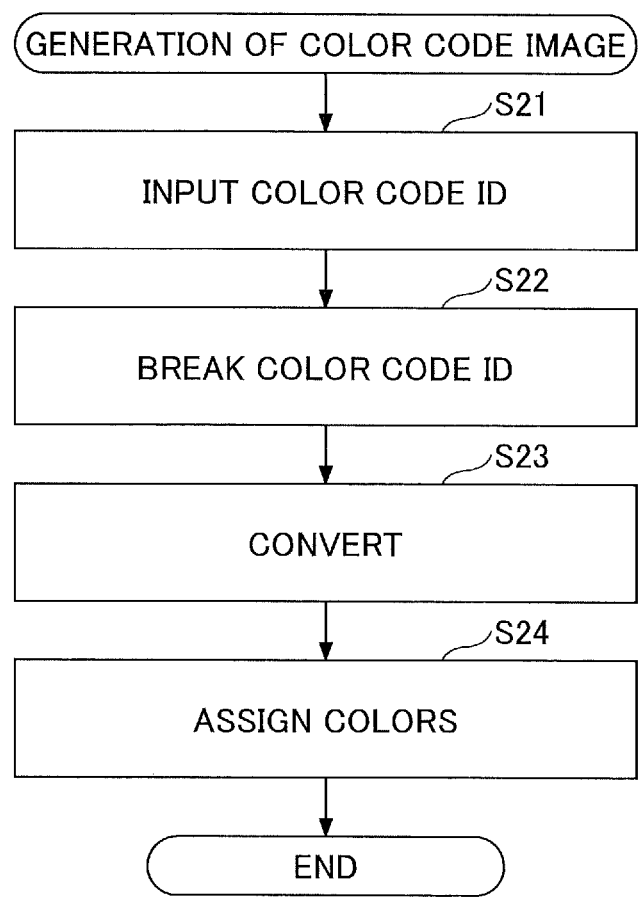
FIG. 7 is a flowchart illustrating an example of a process of generating a color code image.

At step S13, the color code image generator 36 generates the color code image 811 from the color code ID associated with the job ID and the branch number through a process illustrated in FIG. 7. The process illustrated in FIG. 7 may use, for example, a technology described in Japanese Unexamined Patent Application Publication No. 2017-199306. The color code ID may be generated by issuing a new ID for each job ID and each branch number, or may be generated such that the color code ID includes information for identifying the job ID and the branch number.

FIG. 7 is a flowchart illustrating an example of a process of generating a color code image. At step S21, the color code image generator 36 receives an input of a color code ID to be color-coded. At step S22, the color code image generator 36 breaks the character string of the color code ID into values of respective digits. At step S23, the color code image generator 36 converts the values of the digits into values corresponding to the number of colors assigned to the cells of an optical symbol described in Japanese Unexamined Patent Application Publication No. 2017-199306. For example, when the number of colors assigned to each cell is four, the color code image generator 36 converts each of the values of the digits into a ternary number according to, for example, a coding rule illustrated in FIGS. 8A through 8E.

FIGS. 8A through 8E are drawings for explaining coding rules that can express a ternary number. FIGS. 8A through 8E illustrate examples of coding rules in a case where four colors, including an R color (red), a G color (green), a B color (blue), and a K color (black), are used. When four colors are used, the colors can be expressed with three values, i.e., ternary numbers.

For example, as illustrated in FIG. 8A, each clockwise transition, from the R color to the K color, from the K color to the B color, from the B color to the G color, or from the G color to the R color, represents a value "0". Also, each counterclockwise transition, from the R color to the G color, from the G color to the B color, from the B color to the K color, or from the K color to the R color, represents a value "1". Further, each diagonal transition, i.e., each of the transitions between the R color and the B color in both directions and the transitions between the K color and the G color in both directions, represents a value "2".

FIG. 8B illustrates an example where the cell color transitions from left to right in a cell row where cells with the G color, the R color, the B color, the K color, and the G color are connected in this order. In this case, the transition from the G color to the R color represents a value "0", the transition from the R color to the B color represents a value "2", the transition from the B color to the K color represents a value "1", and the transition from the K color to the G color represents a value "2". Accordingly, the arrangement of FIG. 8B represents a value "3d2120", i.e., a decimal value "69". In the notation of the value, "3d" at the beginning indicates that the subsequent number is a ternary number.

The coding rule using the color transitions of four colors is not limited to the example illustrated in FIG. 8A and may be implemented by an example illustrated in FIG. 8D. FIG. 8E illustrates an example of a conversion table that associates color transitions with values according to the coding rule illustrated in FIG. 8D. In FIG. 8E, when, for example, the color of a transition source cell is the R color and a value "2" is to be expressed, the B color is set as the color of a transition destination cell that is adjacent to the transition source cell. Similarly, when the color of the transition source cell is the K color and a value "1" is to be expressed, the G color is set as the color of the transition destination cell.

At step S24 following step S23 of FIG. 7, the color code image generator 36 assigns a color to each cell of the optical symbol based on the color of the transition source cell, the ternary number converted at step S23, and a conversion table for the coding rule as illustrated in FIG. 8A. Here, it is assumed that the color code image generator 36 stores, in advance, the arrangement of the colors of cells in the cell row of the main code of the optical symbol.

Figure 9:
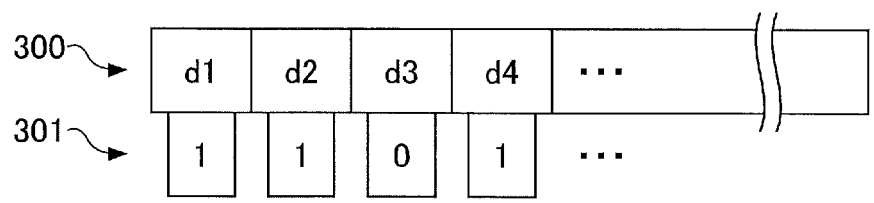
FIG. 9 is a drawing illustrating an example of information to be coded into an optical symbol.
Figure 10:
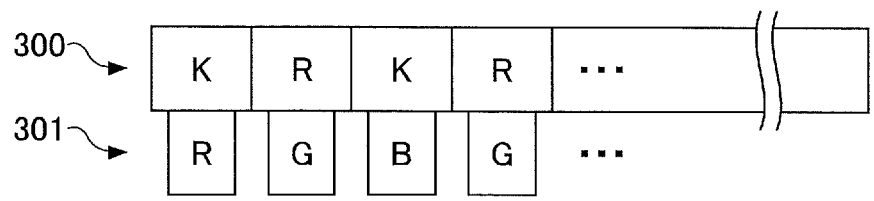
FIG. 10 is a drawing illustrating an example of an optical symbol where the number of colors assigned to each cell of the optical symbol is four.

More specific examples of a case where four colors are assigned to the cells of an optical symbol are described with reference to FIGS. 9 and 10. FIG. 9 is a drawing illustrating an example of information to be coded into an optical symbol. FIG. 10 is a drawing illustrating an example of an optical symbol when the number of colors assigned to each cell of the optical symbol is four.

In the example of FIG. 9, cells of a sub code part 301 connected to cells "d1", "d2", "d3", and "d4" of a main code part 300 have values "3d1", "3d1", "3d0", and "3d1".

FIG. 10 illustrates an example of an optical symbol obtained by coding the information illustrated in FIG. 9 according to the coding rule described with reference to FIGS. 8A through 8E. In this example, the cell row of the main code part 300 includes an even number of cells, the leading cell has the K color, and the K color and the R color are arranged alternately.

In the sub code part 301, for example, a color is assigned to the leftmost cell based on an assumption that the K color of the cell of the main code part 300 to which the leftmost cell is connected is the color of the first transition source. In the example of FIG. 10, the R color is assigned to the leftmost cell of the sub code part 301 of the optical symbol by referring to the conversion table for the coding rule of FIG. 8A based on the K color of the cell of the main code part 300, which is the transition source cell, and the value "3d1" of the cell of the sub code part 301.

At step S14 following step S13 of FIG. 6, the color-code-including-work-instruction-sheet generator 38 generates the work instruction sheet 810 for the information processing system 12 rimmed with the peripheral part 812 having the border color by using the color code image 811 generated at step S13 and the border color associated with the label name. The border color is assigned to the work instruction sheet 810 by printing parameters of the work instruction sheet 810 that include information specifying the rimmed area based on predetermined coordinates or a distance (mm) from the sheet edge and color information such as RGB values or CMYK values applied to the rimmed area.

Figure 11:
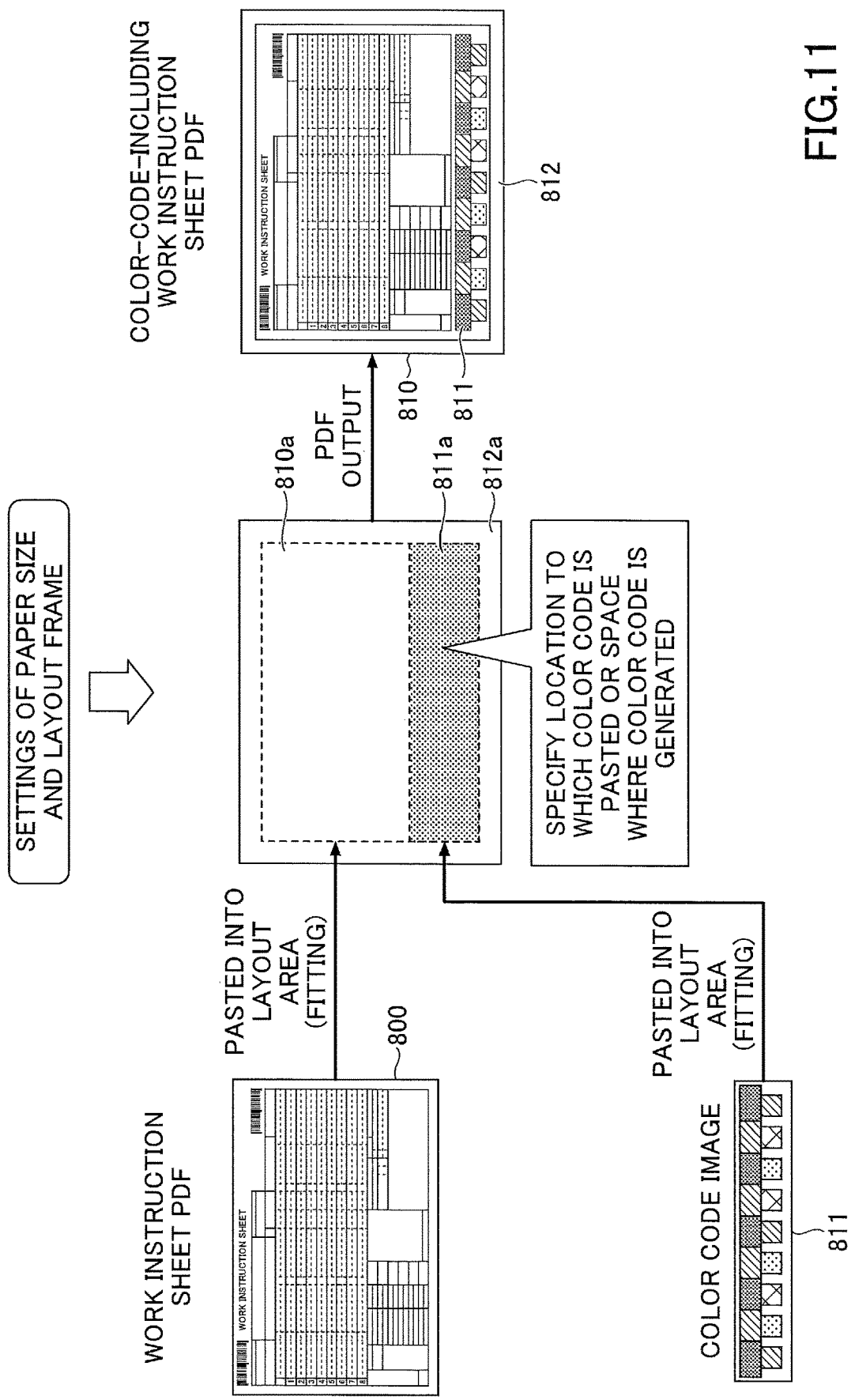
FIG. 11 is a drawing illustrating a process of generating a color-code-including work instruction sheet rimmed with a peripheral part having a border color.

FIG. 11 is a drawing illustrating a process of generating a color-code-including work instruction sheet rimmed with a peripheral part having a border color. The paper size and the layout frame may be set in advance by the operator. For example, the peripheral part 812 (an example of a predetermined area) may have a size and a shape preset by a user using the information processing system 12. Specifically, the user may set the peripheral part 812 as an area having a width of 5 cm from the edge of the work instruction sheet 810, as an area having a width of 10 cm from the edge of the work instruction sheet 810, or as an area outside of a rectangular or oval layout area.

The work instruction sheet 800 for the client system 10 illustrated in FIG. 2A is scaled down by image processing to generate an empty space. The work instruction sheet 810 for the information processing system 12 illustrated in FIG. 2B is generated by pasting the color code image 811 to the empty space generated by scaling down the electronic data of the work instruction sheet 800 for the client system 10 by image processing, and by providing the peripheral part 812 with a border color corresponding to the label name to rim the work instruction sheet 810.

The work instruction sheet 800 for the client system 10 illustrated in FIG. 2A includes the barcode image 801 used in the client system 10. Therefore, if the work instruction sheet 800 for the client system 10 is simply scaled down, the barcode image 801 may become non-functional (unrecognizable).

For this reason, the color-code-including-work-instruction-sheet generator 38 may scale down the work instruction sheet 800 in such a direction that the barcode image 801 does not become non-functional to generate the empty space without impairing the function of the barcode image 801.

At step S15 following step S14 of FIG. 6, the print instruction unit 40 instructs the printer 16 to print the work instruction sheet 810 (color-code-including work instruction sheet) for the information processing system 12 generated at step S14. In response to the instruction from the print instruction unit 40, the printer 16 prints the color-code-including work instruction sheet 810 (the work instruction sheet 810 for the information processing system 12) that is rimmed with the peripheral part 812 having the border color as exemplified in FIG. 2B.

Figure 12:
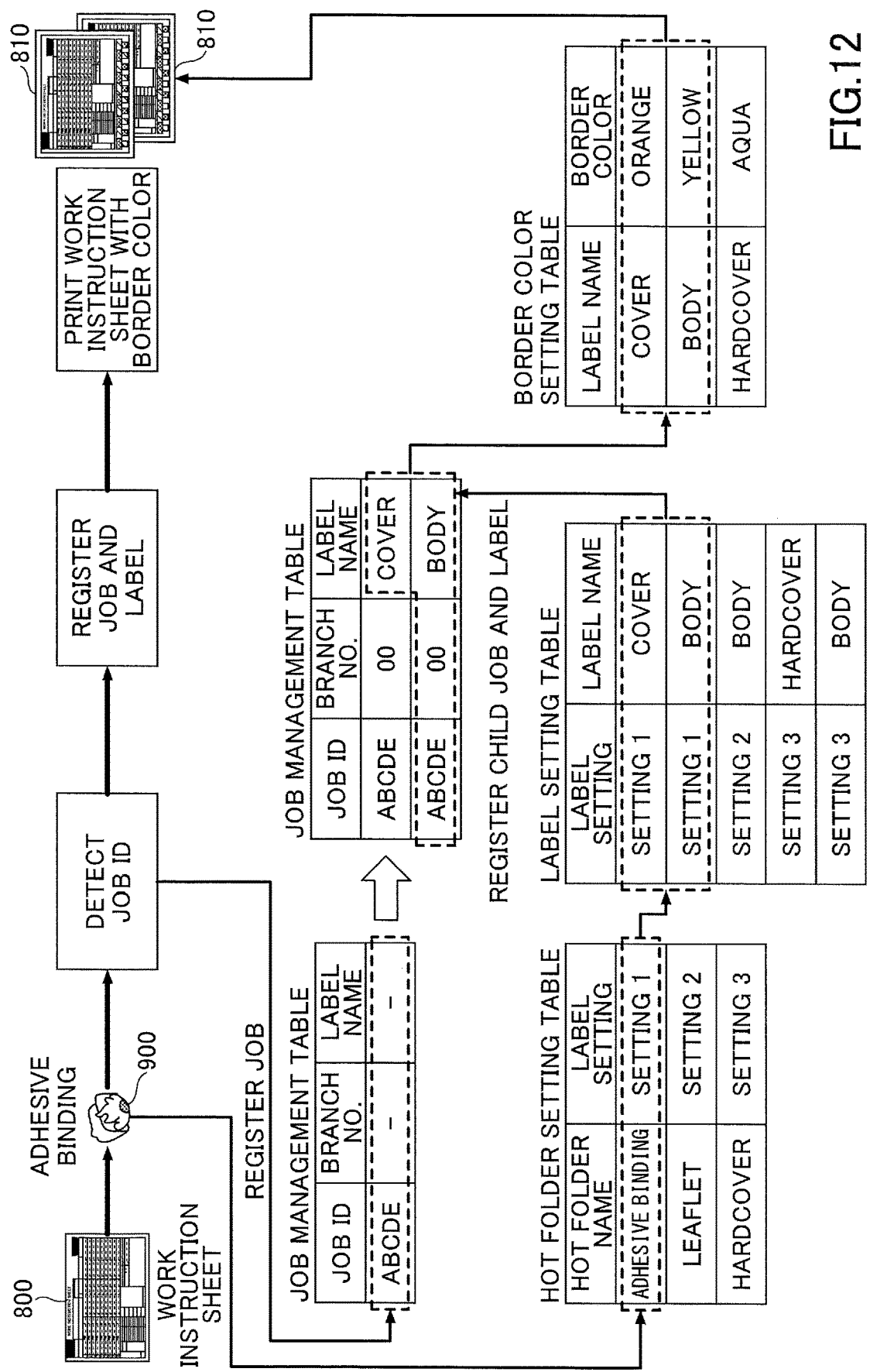
FIG. 12 is a drawing illustrating an example of a process of generating a work instruction sheet for an information processing system that is rimmed with a peripheral part having a border color corresponding to a label name.

A process of generating the work instruction sheet 810 for the information processing system 12 that is rimmed with the peripheral part 812 having a border color corresponding to the label name is performed as exemplified in FIG. 12. FIG. 12 is a drawing illustrating an example of a process of generating a work instruction sheet for an information processing system that is rimmed with peripheral part having a border color corresponding to a label name.

The information processing system 12 of the present embodiment includes hot folders 900 associated with the contents of jobs (e.g., the types of work objects of jobs). The hot folders 900 are provided for the respective types of work objects of jobs. For example, the type names of the work objects of the jobs are set as hot folder names. The types of work objects may be, for example, the types of final products or the types of intermediate products such as parts. Examples of final products include books and booklets produced by binding, and examples of parts include advertisements such as leaflets and direct mail inserted in books, and hard covers and exterior covers of books. The hot folders 900 can receive, from the worker, operations for inputting (storing) electronic files such as work instruction sheets 800 included in the computer 500 (the work process management system 14) from the worker, and are displayed on the display device 502 as folder icons. The hot folders 900 may be implemented as software functions of the work process management system 14 that can be operated by the computer 500, or as functions that can be set by the work process management system 14 and are assigned to folders created by, for example, the computer 500. When the computer 500 receives an operation to store an electronic file of the work instruction sheet 800 in the hot folder 900, the work process management system 14 generates electronic files of one or more work instruction sheets 810 as described later, and subsequently performs a process of instructing the corresponding printer 16 to print the generated electronic files of the one or more work instruction sheets 810.

In FIG. 12, the worker inputs the electronic file of the work instruction sheet 800 for the client system 10 into the hot folder 900 associated with an "adhesive binding" job. The job ID detector 32 of the work process management system 14 detects a job ID "ABCDE" indicated by the barcode image 801 or text from the work instruction sheet 800 for the client system 10 input to the hot folder 900. The job manager 34 registers the job with the job ID "ABCDE" detected by the job ID detector 32 in the job management table. The job management table illustrated in FIG. 12 includes, as fields, a job ID, a branch number (an example of distinction information), and a label name that are associated with each other. The job management table may also include a label ID in addition to the label name. The label name and the label ID are examples of label identification information.

The branch number may not necessarily be numerical values, but may also be any type of information such as alphabetic characters or symbols that can be used to identify a detected second job ID.

Also, the job manager 34 refers to a hot folder setting table of the hot folder 900 in which the work instruction sheet 800 for the client system 10 is input, and reads a label setting "setting 1" associated with the hot folder 900. The hot folder setting table illustrated in FIG. 12 includes, as fields, a hot folder name and a label setting that are associated with each other.

Further, the job manager 34 reads, from a label setting table, label names "cover" and "body" associated with the label setting "setting 1" read from the hot folder setting table. The label setting table illustrated in FIG. 12 includes, as fields, a label setting and a label name that are associated with each other. With the hot folder setting table and the label setting table illustrated in FIG. 12, it is possible to identify the label names "cover" and "body" associated with the hot folder 900 to which the work instruction sheet 800 for the client system 10 is input.

The job manager 34 adds jobs with the identified label names to the job management table based on the job ID detected from the work instruction sheet 800 for the client system 10 input to the hot folder 900 and the label names identified based on the hot folder 900 to which the work instruction sheet 800 for the client system 10 is input.

In the example of FIG. 12, because two label names "cover" and "body" are identified, two jobs (parent jobs) with the branch number "00" and the label names "cover" and "body" are registered in the job management table.

The color-code-including-work-instruction-sheet generator 38 reads job information on jobs with the same job ID and different label names from the job management table, and generates image data of work instruction sheets 810 for these jobs. Here, border colors associated with the label names "cover" and "body" included in the job information are read from a border color setting table and used for the work instruction sheets 810 to be generated. The border color setting table illustrated in FIG. 12 includes, as field, a label name and a border color that are associated with each other.

For example, in FIG. 12, the label name "cover" is associated with the border color "orange", and the label name "body" is associated with the border color "yellow". Therefore, in the example of FIG. 12, image data of a work instruction sheet 810 with the border color "orange" and image data of a work instruction sheet 810 with the border color "yellow" are generated.

Figure 13:
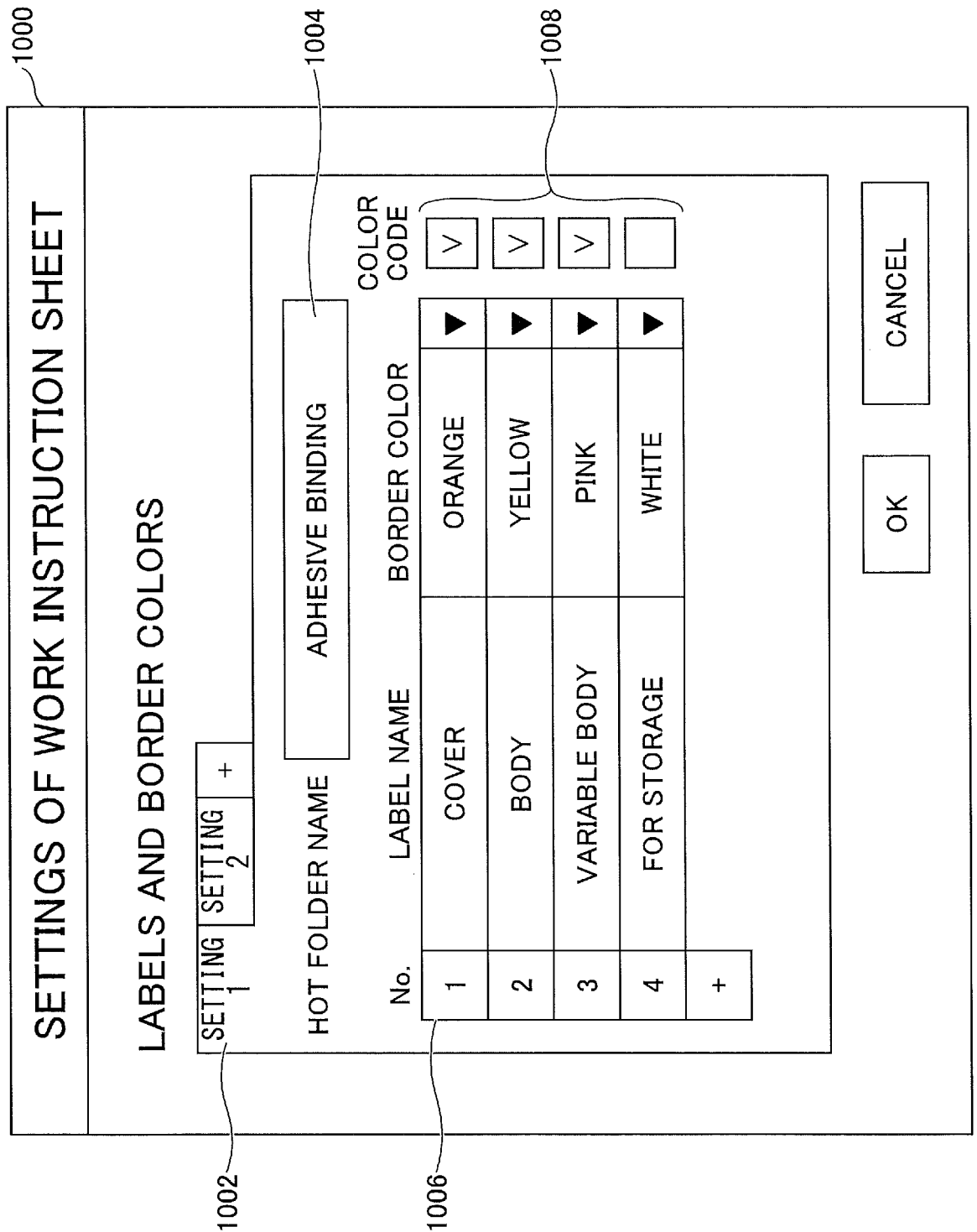
FIG. 13 is a drawing illustrating an example of a label setting screen.

The hot folder setting table, the label setting table, and the border color setting table illustrated in FIG. 12 are set using, for example, a label setting screen 1000 illustrated in FIG. 13. FIG. 13 is a drawing illustrating an example of a label setting screen.

The label setting screen 1000 illustrated in FIG. 13 includes tabs 1002 for switching label settings of hot folders to be displayed. Each tab 1002 corresponds to a hot folder and includes a hot-folder-name input field 1004 and a border-color-setting-table input field 1006. The border-color-setting-table input field 1006 enables setting label names and border colors in association with each other. Each tab 1002 may also include a button for selecting and specifying a folder to which the label settings are assigned, and a button for selecting and specifying a printer(s) 16 for printing the work instruction sheets 810 generated for the respective parts (labels).

The label name is, for example, a name indicating the type of a part or a name indicating a destination. The destination is, for example, a name indicating the storage location of the part or printed material (information that indicates a location to which the worker brings the work instruction sheet 810 printed to be attached to the part). The label name may be set by entering text or selecting an option and is assigned to the same type of items such as parts that are managed collectively in the processes. When the label name is set and added, the corresponding label ID is issued. The border-color-setting-table input field 1006 may include a check box 1008 for setting whether to add the color code image 811 so that a work instruction sheet without the color code image 811 can also be printed.

Figure 23:
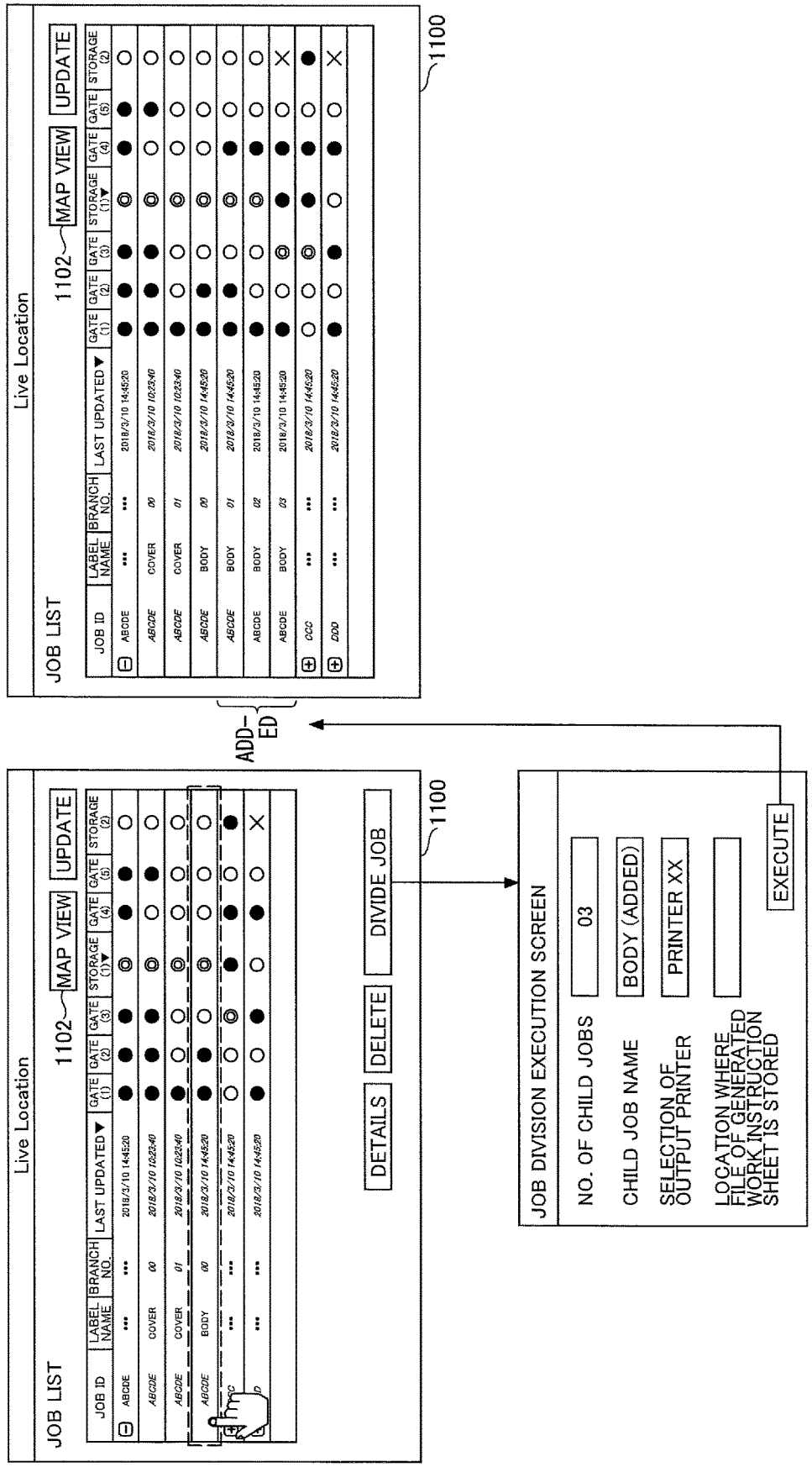
FIG. 23 is a drawing illustrating transition of screens during a process of dividing a job.

Also, the work process management system 14 may include a function to receive, from a user, operations to generate child jobs during a job when, for example, it becomes necessary to divide the job to increase the number of pallets on which parts or printed materials are loaded because of an increase in the volume of the parts as a result of folding and cutting or addition of a different type of part during the job. When operations to generate child jobs are received, the work process management system 14 issues work instruction sheets 810 for the child jobs, which are managed based on branch numbers, by using information on the parent job so that the work instruction sheets 810 for the child jobs inherit the job ID and the label name of the work instruction sheet 810 for the parent job. For example, in the operations to generate child jobs, the user may select a row in a job status list screen 1100 of FIG. 16 that corresponds to a job, a parent job, or a child job identified by a job ID, a label name indicating a part, and a branch number, instructs to divide the selected job, enters the number of child jobs to be generated by dividing the selected job, selects an output printer, selects a folder where files of work instruction sheets 810 of the generated child jobs are to be stored, and instructs the output printer to print the work instruction sheets 810. These operations may be performed on a UI screen illustrated in FIG. 23. The UI screen may also include a button to delete the selected job, parent job, or child job, and a button to display details. A similar job division process may also be performed by selecting a printed material, a part, or a pallet displayed on a map display screen 1200 of FIG. 17 or an area display screen 1300 of FIG. 18. Alternatively, a predetermined number of child jobs may be generated by storing a generated electronic file of a work instruction sheet 810 of a parent job in a hot folder for generating child jobs. Also, a job ID, a branch number, and a part may be obtained by reading a code on a work instruction sheet 810 with a barcode reader, a color code reader, or a scanner connected to the computer 500 or with an in-line sensor on the conveying path of the printer 16, or by capturing the work instruction sheet 810 with a predetermined camera 18 for generating child jobs; the obtained job ID, the branch number, and the part may be displayed on the computer 500; and a screen may be displayed to allow the worker to enter a child job generation instruction, the number of child jobs to be generated, and a print instruction to generate the child jobs.

Figure 14:
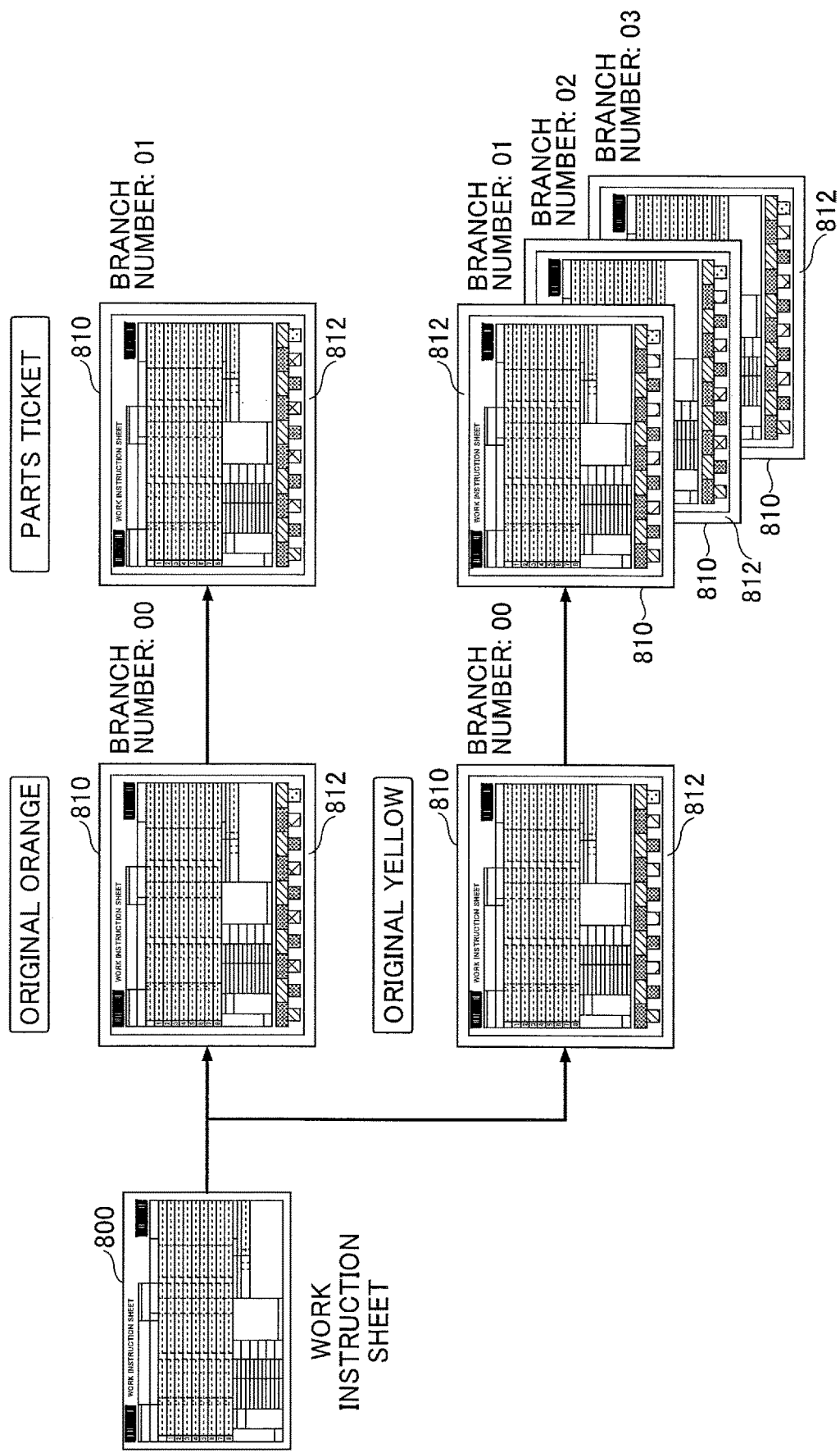
FIG. 14 is a drawing illustrating examples of parent jobs and child jobs.

FIG. 14 is a drawing illustrating examples of parent jobs and child jobs. In FIG. 14, two types of work instruction sheets 810 (e.g., work instruction sheets 810 with label names "cover" and "body") for the information processing system 12 are issued based on the work instruction sheet 800 for the client system 10.

In the example illustrated on the upper side of FIG. 14, one child job is issued from a work instruction sheet 810 for the information processing system 12 (e.g., a work instruction sheet 810 with the label name "cover") of a parent job. The work process management system 14 manages the parent job using a branch number "00" and manages the child job using a branch number other than the branch number "00" (for example, a branch number "01" or a subsequent number). Here, "management" indicates issuing a new branch number "01" for a child job based on a parent job having a job ID "ABCDE", a label name "cover", and a branch number "00" illustrated in FIG. 12, and storing the child job in association with the job ID "ABCDE", the label name "cover", and the branch number "01".

In the example illustrated on the lower side of FIG. 14, three child jobs are issued from another work instruction sheet 810 for the information processing system 12 (e.g., a work instruction sheet 810 with the label name "body") of a parent job. The work process management system 14 manages the parent job using a branch number "00" and manages the child jobs using branch numbers "01" through "03" other than the branch number "00". Here, "management" indicates issuing new branch numbers "01" through "03" for child jobs based on a parent job having a job ID "ABODE", a label name "body", and a branch number "00" illustrated in FIG. 12, and storing the child jobs in association with the job ID "ABODE", the label name "body", and the branch numbers "01" through "03".

In the example of FIG. 14, the work process management system 14 has issued two types of parent jobs based on the work instruction sheet 800 for the client system 10, one child job branching from the upper parent job, and three child jobs branching from the lower parent job. In the example of FIG. 14, the parent jobs and the child jobs derived from the parent jobs are stored and managed in association with each other so that the number of parent jobs and child jobs derived from the work instruction sheet 800 for the client system 10 can be managed.

With this management method, for example, the work process management system 14 can set, as triggers, a condition that all the parent jobs and the child jobs linked to the work instruction sheet 800 for the client system 10 are detected based on information detected from images captured by one or more camera 18 and a condition that all the child jobs branching from a parent job are detected based on information detected from images captured by one or more camera 18. Also, with this management method, the work process management system 14 can determine the positions of parent jobs and child jobs linked to the work instruction sheet 800 for the client system 10.

For example, even when child jobs are generated during a job and the number of pallets is increased, the work process management system 14 can detect a state where all pallets are present in a specific location as a trigger and can detect the positions of pallets of the child jobs branching from a parent job.

«Updating Job Status when Passing Through Gate»

In the job management system 1 of the present embodiment, the job status in the job management table storage 48 is updated as described below when the work instruction sheet 810 for the information processing system 12, which is rimmed with the peripheral part 812 having a border color corresponding to the label name and to which the color code image 811 is added, is captured by the camera 18a or 18b.

Figure 15:
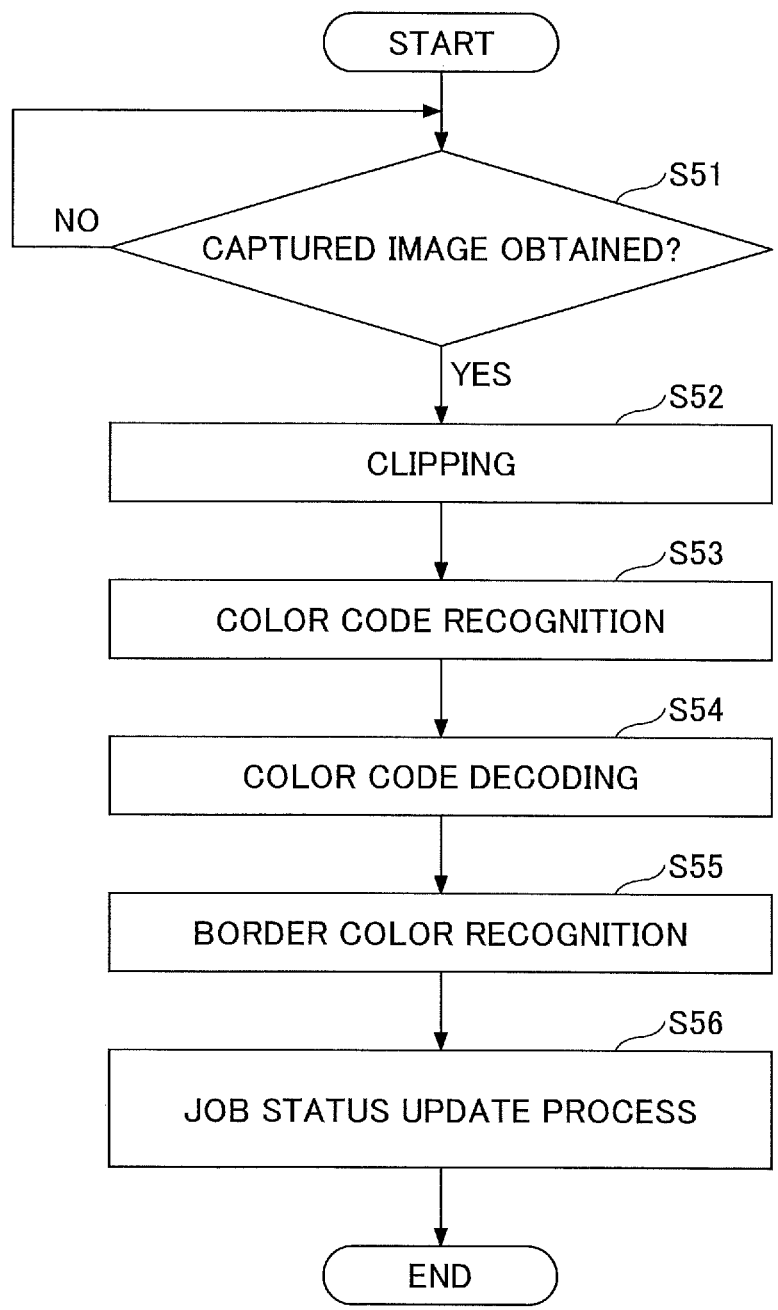
FIG. 15 is a flowchart illustrating an example of a job status update process performed when a work object passes through a gate.

FIG. 15 is a flowchart illustrating an example of a job status update process performed when a work object passes through a gate. When a captured image or a captured video is obtained from the camera 18a or 18b at step S51, the captured image acquisition unit 42 of the work process management system 14 proceeds to step S52.

At step S52, the color code recognizer 102 of the recognizer 44 attempts to clip the color code image 811 from the captured image or the captured video obtained by the captured image acquisition unit 42. At step S53, the color code recognizer 102 recognizes the color code image 811 according to a process described in, for example, Japanese Unexamined Patent Application Publication No. 2017-199306.

When the color code image 811 is recognized, the color code recognizer 102 detects an image of each cell from the color code image 811. At step S54, the color code recognizer 102 recognizes, as symbol information, color information and connection information of each cell detected at step S53.

For example, the color code recognizer 102 restores the color code ID encoded in the color code image 811 by decoding the symbol information according to the coding rule illustrated in FIG. 8A. At step S55, the label color recognizer 104 of the recognizer 44 recognizes the border color of the peripheral part 812 of the work instruction sheet 810 from the captured image or the captured video obtained by the captured image acquisition unit 42.

At step S56, the color code recognizer 102 provides, to the job manager 34, the identifier of the camera 18a that has captured the color code image 811 and the color code ID restored by decoding. Also, the label color recognizer 104 provides, to the job manager 34, the identifier of the camera 18a that has captured the color code image 811 and the recognized border color of the peripheral part 812 of the work instruction sheet 810. The job manager 34 refers to the job management table storage 48 to identify the job ID and the branch number corresponding to the color code ID.

For example, based on the identifier of the camera 18a that has captured the color code image 811, and the job ID and the branch number corresponding to the color code ID restored from the color code image 811, the job manager 34 can update the job status being managed in the job management table from, for example, "undetected" to "passed". Also, the job manager 34 can distinguish and manage the work instruction sheets 810 having the same color code image 811 and different label names based on, for example, the identifier of the camera 18a that has captured the color code image 811, the job ID and the branch number corresponding to the color code ID restored from the color code image 811, and the recognized border colors of the peripheral parts 812 of the work instruction sheets 810. Also, color code IDs may be associated with all of job IDs, branch numbers, and label names (label identifiers) so that all of parent jobs, child jobs, and parts can be identified based solely on color code IDs. Further, a job ID, a branch number, and a label name (label identifier) may be directly included in a color code.

«Job Inquiry»

The operator or the worker of the job management system 1 can refer to the progress information and the history information of work processes of jobs in a printing factory, captured image files or captured video files indicating states at the time when work instruction sheets 810 are captured, and map views and area views via UI screens provided by the work process management system 14. The UI screens are displayed on the display device 502 of the computer 500. The UI screens may also be displayed on the operation screen of the printer 16 or the operation screen of a digital front end (DFE) device that is connected to the printer 16, processes job information received from the computer 500, and sends the processed job information to the printer 16. Further, the UI screens may be displayed on a touch panel of a mobile terminal connected to the job management system 1. Screen information and screen components for displaying the UI screens are generated by, for example, the work process management system 14 or the client system 10 and sent to any of the apparatuses described above. The UI screens may be screen information displayed by software of the apparatus or Web page information displayed on a Web browser of the apparatus.

FIG. 16 is a drawing illustrating an example of a UI screen displayed by a work process management system. The UI unit 30 of the work process management system 14 displays, for example, a job status list screen 1100 on the display device 502. The job status list screen 1100 of FIG. 16 displays a list of job information including a job ID, a label name, a branch number, last updated time, and progress information of one or more work processes. In the update process, the capturing of images by the cameras 18 and the recognition of color codes and border colors of work instruction sheets 810 from the captured images are performed at predetermined intervals such as every 30 seconds or every 5 minutes. The update process may be performed only when the factory is in operation, or the interval of the update process may be changed depending on time of day, e.g., operation time or non-operation time.

The progress of each work process is indicated by, for example, one of the states "○: undetected", "●: passed", "◉: current process", and "X: alert". The state "undetected" indicates that the work instruction sheet 810 for the information processing system 12 has not been captured by the camera 18 corresponding to the work process. The state "passed" indicates that the work instruction sheet 810 for the information processing system 12 has been recognized based on an image captured by the camera 18 corresponding to the work process at an update event before the last update event. The state "current process" indicates that the work instruction sheet 810 for the information processing system 12 has been recognized based on an image captured by the camera 18 corresponding to the work process at the last update event. The state "alert" indicates that an alert such as a stay alert has been generated. The stay alert indicates that the work instruction sheet 810 is in the same place for a predetermined time period or longer or the work instruction sheet 810 cannot be recognized for a predetermined time period or longer.

The label names in the job status list screen 1100 are the same as the label names read from, for example, the border color setting table of FIG. 12 using the recognized border colors of the peripheral parts 812 of the work instruction sheets 810 as search keys.

The operator or the worker can display job detailed history screen 1110 by selecting one of the job IDs from the job status list screen 1100. The job detailed history screen 1110 may display branch numbers, time recognized at the last update, and locations of a parent job and child jobs for each label name of the selected job ID "ABODE". The job detailed history screen 1110 may also include buttons shaped like a camera or a video camera for causing transition to screens that display captured images or captured videos of parent jobs and child jobs for respective label names indicating parts included in a job.

Figure 17:
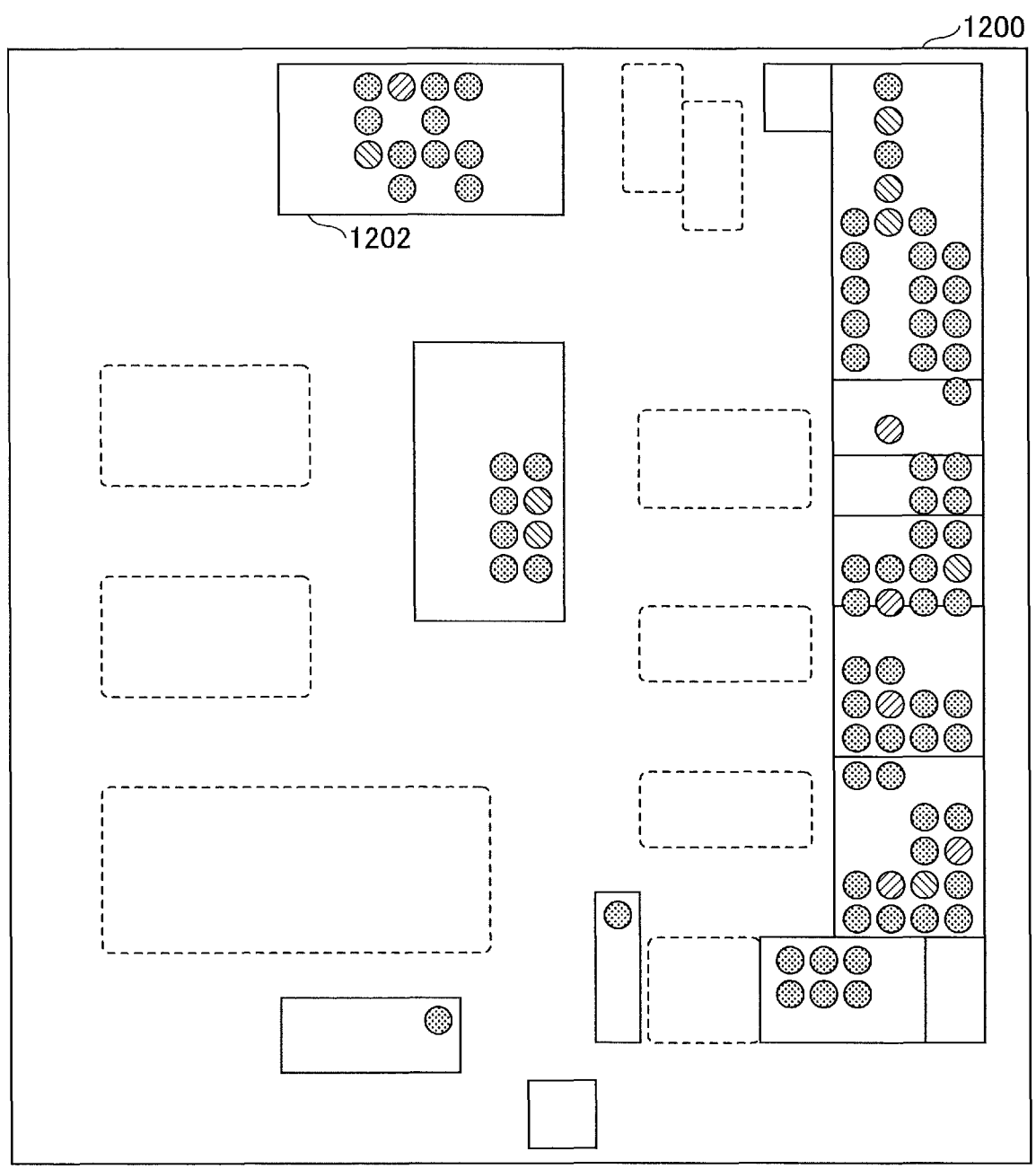
FIG. 17 is a drawing illustrating an example of a map display screen for displaying the entire factory.

When a button 1102 for transitioning to a map display screen 1200 of a job is pressed, the UI unit 30 transitions to the map display screen 1200 exemplified in FIG. 17. FIG. 17 is a drawing illustrating an example of a map display screen for displaying the entire factory. For example, the UI unit 30 displays a captured image of the entire factory in the background, and then displays marks such as "●" so that the locations of printed materials can be identified. The colors of the marks "●" indicating the locations of the printed materials may indicate the progress of job work processes indicated by the marks. Also, based on the recognition result of a work instruction sheet 810, the corresponding printed material may be displayed with a mark such as "●". Further, the color of the "●" mark may be set by using label color information so that the color of the "●" mark becomes the same as or similar to the label color indicating the part.

The map display screen 1200 of FIG. 17 displays multiple storage areas (preparation areas) such that they are distinguishable from each other. For example, the user may select a storage area 1202 from the map display screen 1200 of FIG. 17 to switch the map display screen 1200 to an area display screen 1300 illustrated in FIG. 18 that displays the selected storage area 1202. The area display screen 1300 is an example of a screen that maps the selected storage area 1202 and displays events that occurred in the storage area 1202.

Figure 18:
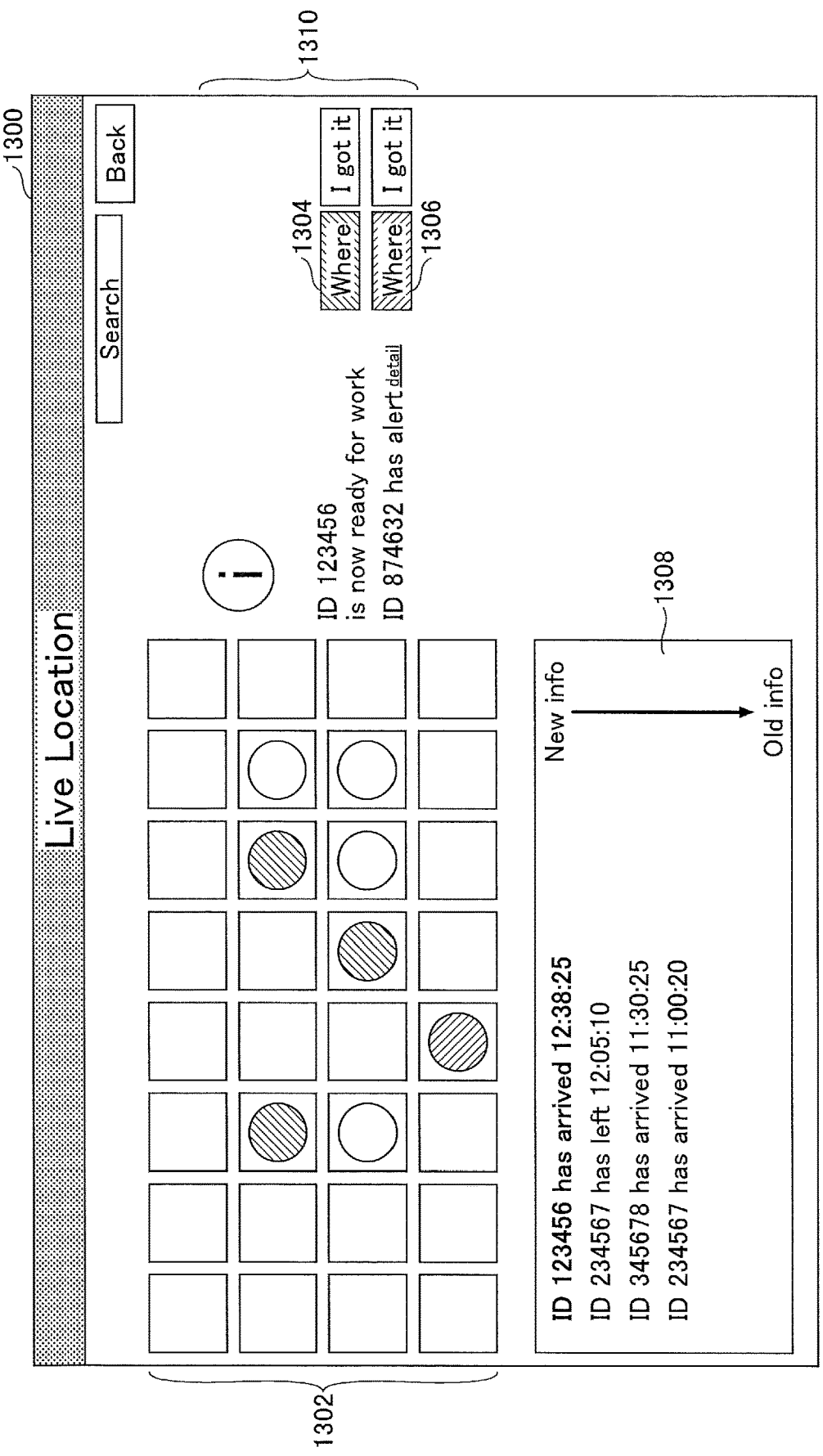
FIG. 18 is a drawing illustrating an example of an area display screen displaying a storage area.

FIG. 18 is a drawing illustrating an example of an area display screen displaying a storage area. For example, the UI unit 30 divides the selected storage area 1202 into detailed areas 1302 and displays marks such as "●" to indicate the locations of printed materials. In the area display screen 1300 of FIG. 18, for example, marks such as "●" are displayed at the locations of printed materials, which are job work objects detected using the work instruction sheets 810 for the information processing system 12, or the locations of pallets carrying the printed materials.

In the area display screen 1300 of FIG. 18, for example, colors for identification may be given to marks such as "●" for respective job IDs. In FIG. 18, for example, the default color of the marks may be set to gray, and when a button 1304 or 1306 is pressed, an identification color such as blue or red may be assigned to marks with a job ID corresponding to the pressed button 1304 or 1306. Alternatively, the colors of the "●" marks may be set using label color information so that the colors of the "●" marks become the same as or similar to the label colors indicating parts.

The area display screen 1300 includes a log display field 1308 that displays a log of events occurred in the selected storage area 1202. For example, the log display field 1308 displays events such as entry and exit of pallets identified by job IDs into and out of the storage area 1202 and the occurrence of errors are displayed.

Also, user notification information 1310 is displayed on the right side of the area display screen 1300 of FIG. 18. For example, the user notification information 1310 reports a state where all parent jobs and child jobs linked to a job ID are present (preparation for the next work process is completed), a state where child jobs linked to one of parent jobs (parts) are present, or a state where an alert is issued.

The colored buttons 1304 and 1306 are provided in the user notification information 1310 of FIG. 18. For example, in the area display screen 1300 of FIG. 18, when the blue button 1304 is pressed, the color of marks with the job ID "123456" corresponding to the blue button 1304 is changed to blue. Also, in the area display screen 1300 of FIG. 18, when the red button 1306 is pressed, the color of marks with the b ID "874632" corresponding to the red button 1306 is changed to red.

Even when there are child jobs obtained by dividing parent jobs, the operator or the worker can easily recognize that parent jobs necessary for the next work process and all child jobs obtained by dividing the parent jobs are present and the preparation for the next work process has been completed, by referring to the area display screen 1300 of FIG. 18. Also, the operator or the worker can easily recognize that an alert has been issued by referring to the area display screen 1300 of FIG. 18.

As described above, the work process management system 14 of the present embodiment can print the work instruction sheet 810 for the information processing system that is rimmed with the peripheral part 812 having a border color, and can use the border color of the work instruction sheet 810 as a label associated with the content of a job. By using border colors of work instruction sheets 810 as labels associated with the contents of jobs, the work process management system 14 can easily manage child jobs based on the work instruction sheets 810.

Also, in the work process management system 14 of the present embodiment, the visibility of the work instruction sheets 810 is improved by the border colors. This makes it easier for the worker to find a desired work instruction sheet 810 and thereby makes it possible to improve work efficiency. Also, the improved visibility of the work instruction sheet 810 makes it possible to prevent the worker from misplacing or forgetting to attach the work instruction sheet 810.

In the work process management system 14 of the present embodiment, the work instruction sheet 810 printed on white paper is used instead of a work instruction sheet printed on colored paper that represents the content of a job. This makes it possible to use, for the work instruction sheet 810, a technology for expressing a code with colors such as the color code image 811 that tends to be affected by colored paper. Thus, by expressing the content of a job with the border color of the work instruction sheet 810, the work process management system 14 of the present embodiment can achieve both of an effect of enabling the user to intuitively and visually recognize the content of the job and an effect provided by the technology for expressing a code with colors using, for example, the color code image 811.

Second Embodiment

In the first embodiment, the work process management system 14 generates the work instruction sheet 810 for the information processing system 12. In a second embodiment, the work instruction sheet 810 for the information processing system 12 is generated by the client system 10. Except for some components, the second embodiment is substantially the same as the first embodiment. Therefore, descriptions of components of the second embodiment that are the same as those of the first embodiment are omitted here.

<System Configuration>

Figure 19:
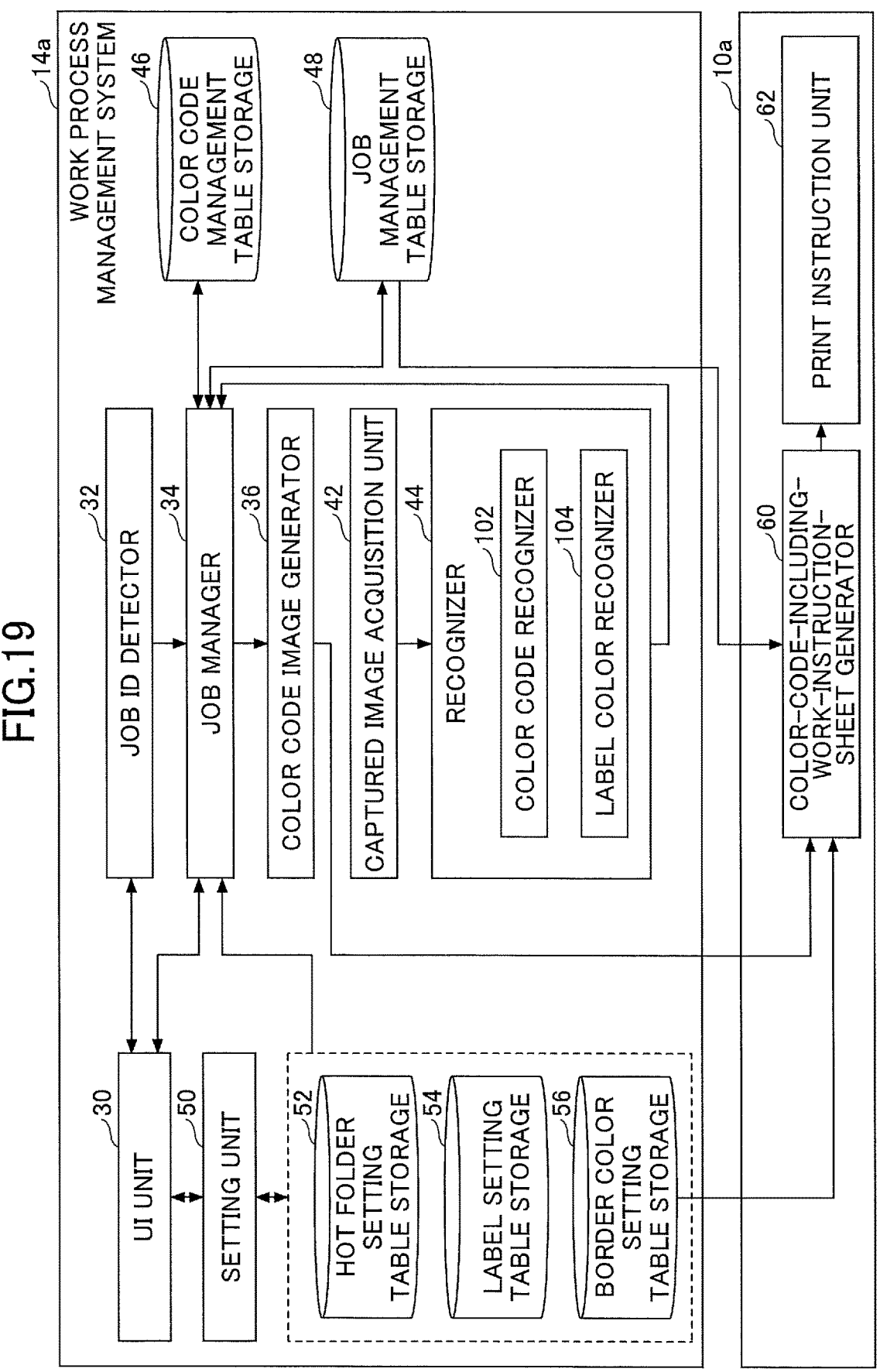
FIG. 19 is a drawing illustrating another example of a functional configuration of a work process management system.

FIG. 19 is a drawing illustrating another example of a functional configuration of a work process management system. A work process management system 14a of FIG. 19 has a configuration obtained by removing the color-code-including-work-instruction-sheet generator 38 and the print instruction unit 40 from the work process management system 14 of FIG. 4. In contrast, a client system 10a additionally includes a color-code-including-work-instruction-sheet generator 60 and a print instruction unit 62.

In the job management system 1 of the second embodiment, the process up to the generation of the color code image 811 is performed by the work process management system 14a similarly to the first embodiment, and steps S14 and S15 of FIG. 6 are performed by the color-code-including-work-instruction-sheet generator 60 and the print instruction unit 62 of the client system 10a.

The job management system 1 of the second embodiment provides effects similar to those provided by the job management system 1 of the first embodiment.

Third Embodiment

In the first and second embodiments described above, the work instruction sheet 810 for the information processing system 12 is printed on a print medium such as paper with the printer 16. Alternatively, the work instruction sheet 810 for the information processing system 12 may be displayed on a display medium (display device) such as electronic paper or a liquid crystal display (LCD).

Figure 20:
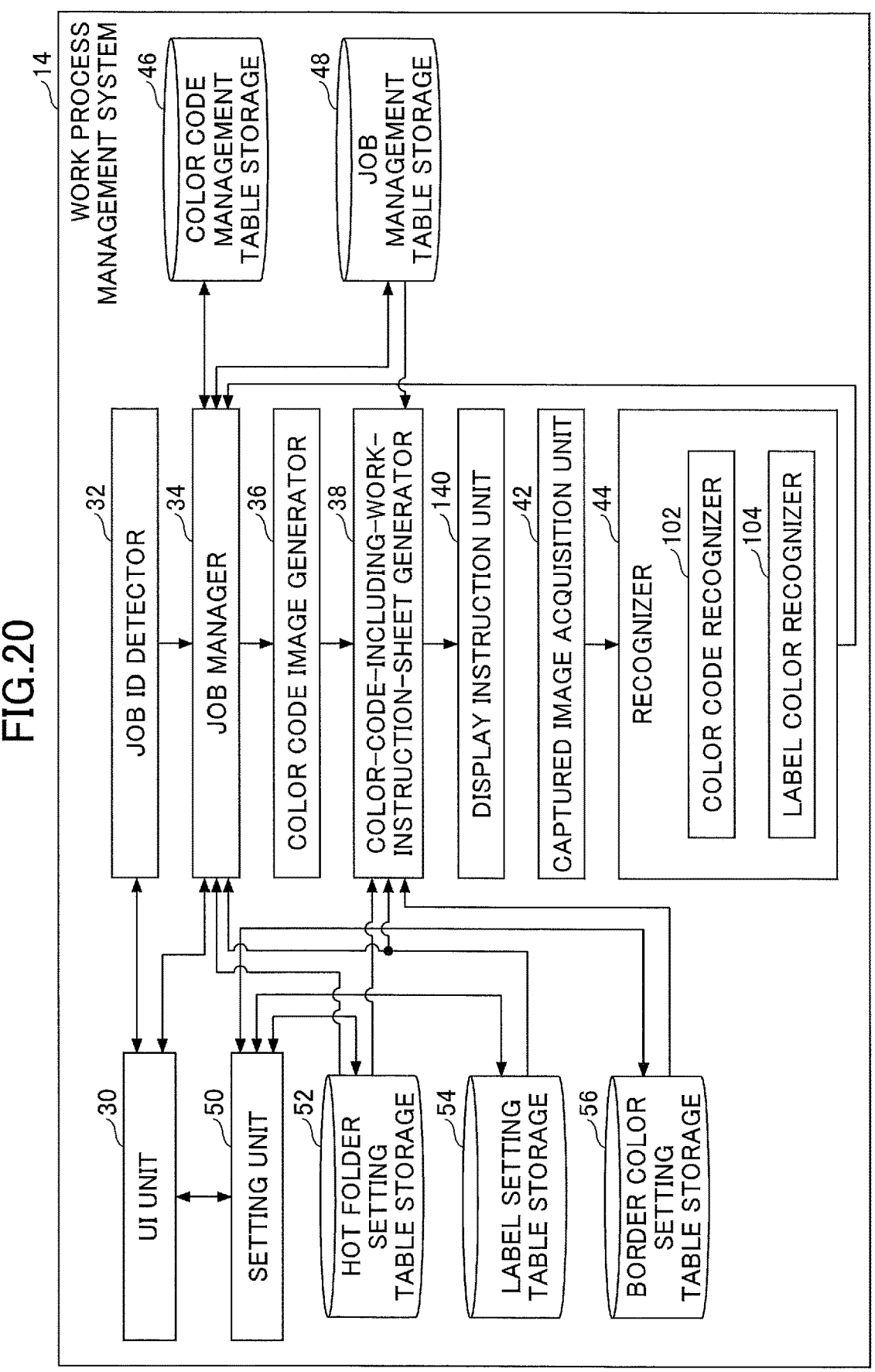
FIG. 20 is a drawing illustrating another example of a functional configuration of a work process management system.

FIG. 20 is a drawing illustrating another example of a functional configuration of a work process management system. The work process management system 14 of FIG. 20 has a configuration in which the print instruction unit 40 of the work process management system 14 of FIG. 4 is replaced with a display instruction unit 140. The display instruction unit 140 instructs a display device to display the work instruction sheet 810 for the information processing system 12 that includes the color code image 811 of FIG. 2B and is rimmed with the peripheral part 812 having a border color.

The display device displays, for example, the color-code-including work instruction sheet 810 (the work instruction sheet 810 for the information processing system 12) that is rimmed with the peripheral part 812 having a border color as illustrated in FIG. 2B according to an instruction from the display instruction unit 140.

Fourth Embodiment

The first through third embodiments described above are directed to the management of the work processes of a job in a printing factory. However, the present invention may also be applied to the management of the work processes of an article being conveyed on a belt conveyor. For example, applying the technology of the present embodiment to the management of work processes of an article being conveyed on a belt conveyor makes it possible to track the article being conveyed on the belt conveyor and to control the branching of the belt conveyor.

Further, the first through third embodiments described above may also be applied to a technology for a transport system represented by, for example, an automated guided vehicle (AGV). For example, in a transport system for transporting an article, work processes of the article being transported by a transport device may be managed by attaching the work instruction sheet 810 for the information processing system 12, which includes the color code image 811 and is rimmed with the peripheral part 812 having a border color, to the article and by capturing the article being transported with the cameras 18. Also, because the first through third embodiments make it possible to identify the position of the transport device transporting the article and the destination of the article, the transport system can also control the movement of the transport device transporting the article.

[Variations]

In the above embodiments, the border color of the work instruction sheet 810 is used as a label. However, the color of a mark or the color of characters may also be used as a label. In this case, for example, the border color setting table of FIG. 12 may be replaced with a mark color setting table or a character color setting table. The mark color setting table includes fields such as a label name and a mark color that are associated with each other. The character color setting table includes fields such as a label name and a character color that are associated with each other. Thus, the color of the mark or characters of the work instruction sheet 810 may be used as a mark color or a character color associated with a label name included in job information.

An information processing system, an information processing method, and an information processing apparatus according to the embodiments of the present invention are described above. However, the present invention is not limited to the specifically disclosed embodiments, and variations and modifications may be made without departing from the scope of the present invention.

The color-code-including-work-instruction-sheet generator 38 is an example of a generation unit. The print instruction unit 40 is an example of an instruction unit. The printer 16 is an example of a printing unit and a printing device.

The job manager 34 is an example of a management unit. The cameras 18a and 18b are examples of imagers. The recognizer 44 is an example of a recognition unit. The work process management system 14 is an example of an information processing apparatus. A parent form is an example of a first form. A child form is an example of a second form. The area display screen 1300 is an example of a user interface.

What is claimed is:

1. An information processing system, comprising:
a printer; and
a processor programmed to
generate image data of a first form and one or more second forms, the image data of both the first form and the second form including respective code images which identify a job,
wherein generating image data of the first form comprises including generating a predetermined area having a predetermined color that is associated with one or more parts constituting a final product of the job identified by the first form, and
wherein generating image data of the one or more second forms comprises the one or more second forms inheriting the predetermined color of the predetermined area from the first form,
instruct the printer to print the first form using the image data of the first form, and to print the one or more second forms using the image data of the one or more second forms, and
manage the job identified by the first form and the one or more second forms by using the predetermined color of the predetermined area of the first form and the one or more second forms,
wherein the predetermined area is an area with a predetermined width from an edge of a recording medium on which each of the first form and the one or more second forms is printed.

2. The information processing system as claimed in claim 1, wherein the processor is programmed to
generate the image data of the first form using the predetermined color corresponding to the one or more parts by processing image data of an original form according to predetermined rules in response to input of the image data of the original form, and
generate the image data of the one or more second forms using the predetermined color corresponding to the image data of the first form.

3. The information processing system as claimed in claim 2, wherein the processor is programmed to
generate the image data of the first form when the image data of the original form is stored in a predetermined folder according to the predetermined rules set for the predetermined folder, and
generate the image data of a specified number of the second forms when the image data of the first form or the job corresponding to the first form is specified according to a predetermined method and the number of the second forms is specified.

4. The information processing system as claimed in claim 3, wherein the predetermined rules set, for each of one or more folders, the predetermined color corresponding to each of the one or more parts and a printer for printing the image data of the first form whose predetermined area is colored with the predetermined color.

5. The information processing system as claimed in claim 1, further comprising:
one or more imagers configured to capture the first form and the one or more second forms,
wherein the processor is programmed to
recognize the predetermined color of the predetermined area from images of the first form and the one or more second forms captured by the imagers, and
manage states of the one or more parts included in the job by recognizing the first form and the one or more second forms at locations of the imagers based on the imagers capturing the first form and the one or more second forms and the predetermined color of the predetermined area recognized from the captured images of the first form and the one or more second forms.

6. The information processing system as claimed in claim 5, wherein the imagers are installed in locations corresponding to one or more work processes of the job.

7. The information processing system as claimed in claim 6, wherein when all of the first form and the one or more second forms branching from the first form are present in a predetermined location, the processor displays a message to that effect on a user interface.

8. The information processing system as claimed in claim 6, wherein the processor is programmed to display, on a user interface, positions where the first form and the one or more second forms branching from the first form are located.

9. The information processing system as claimed in claim 1, wherein the first form and the one or more second forms are attached to the one or more parts constituting the final product of the job or to transportation equipment for carrying a work object.

10. The information processing system as claimed in claim 1, wherein the code image is a color code image.

11. A method performed by an information processing apparatus including a processor, the method comprising:
generating image data of a first form and one or more second forms, the image data of both the first form and the second form including respective code images which identify a job,
wherein generating image data of the first form comprises including generating a predetermined area having a predetermined color that is associated with one or more parts constituting a final product of the job identified by the first form, and
wherein generating image data of the one or more second forms comprises the one or more second forms inheriting inherit the predetermined color of the predetermined area from the first form,
instructing a printer to print the first form using the image data of the first form, and to print the one or more second forms using the image data of the one or more second forms, and
managing the job identified by the first form and the one or more second forms by using the predetermined color of the predetermined area of the first form and the one or more second forms,
wherein the predetermined area is an area with a predetermined width from an edge of a recording medium on which each of the first form and the one or more second forms is printed.

12. An information processing apparatus, comprising:
a processor programmed to
generate image data of a first form and one or more second forms, the image data of both the first form and the second form including respective code images which identify a job,
wherein generating image data of the first form comprises including generating a predetermined area having a predetermined color that is associated with one or more parts constituting a final product of the job identified by the first form, and
wherein generating image data of the one or more second forms comprises the one or more second forms inheriting the predetermined color of the predetermined area from the first form,
instruct a printer to print the first form using the image data of the first form, and to print the one or more second forms using the image data of the one or more second forms, and
manage the job identified by the first form and the one or more second forms by using the predetermined color of the predetermined area of the first form and the one or more second forms,
wherein the predetermined area is an area with a predetermined width from an edge of a recording medium on which each of the first form and the one or more second forms is printed.

13. The information processing system as claimed in claim 1, wherein the code image included in the first form is a first code image, and the code image included in the second form is a second code image.

14. The information processing system as claimed in claim 1, wherein the first code image and the second code image are associated with a same job ID.

15. An information processing system, comprising:
a printer; and
a processor programmed to
generate image data of a first form and one or more second forms, the image data of both the first form and the second form including respective code images which identify a job,
wherein generating image data of the first form comprises including generating a predetermined area having a predetermined color that is associated with one or more parts constituting a final product of the job identified by the first form, and
wherein generating image data of the one or more second forms comprises the one or more second forms inheriting the predetermined color of the predetermined area from the first form,
instruct the printer to print the first form using the image data of the first form, and to print the one or more second forms using the image data of the one or more second forms, and
manage the job identified by the first form and the one or more second forms by using the predetermined color of the predetermined area of the first form and the one or more second forms,
wherein
the job includes a printing process;
the final product of the job is a booklet;
the one or more parts constituting the final product are one or more printed materials constituting the booklet;
each of the first form and the one or more second forms is a work instruction sheet in which work processes or apparatuses for producing the booklet are described;
the first form is generated by assigning the predetermined color associated with each of the one or more printed materials constituting the booklet to the work instruction sheet; and
when a storage location of one of the printed materials is divided into multiple locations, a corresponding number of the second forms inheriting the predetermined color are generated.

16. A method performed by an information processing apparatus including a processor, the method comprising:
generating image data of a first form and one or more second forms, the image data of both the first form and the second form including respective code images which identify a job,
wherein generating image data of the first form comprises including generating a predetermined area having a predetermined color that is associated with one or more parts constituting a final product of the job identified by the first form, and
wherein generating image data of the one or more second forms comprises the one or more second forms inheriting inherit the predetermined color of the predetermined area from the first form;
instructing a printer to print the first form using the image data of the first form, and to print the one or more second forms using the image data of the one or more second forms, and
managing the job identified by the first form and the one or more second forms by using the predetermined color of the predetermined area of the first form and the one or more second forms,
wherein
the job includes a printing process,
the final product of the job is a booklet;
the one or more parts constituting the final product are one or more printed materials constituting the booklet;
each of the first form and the one or more second forms is a work instruction sheet in which work processes or apparatuses for producing the booklet are described;
the first form is generated by assigning the predetermined color associated with each of the one or more printed materials constituting the booklet to the work instruction sheet; and
when a storage location of one of the printed materials is divided into multiple locations, a corresponding number of the second forms inheriting the predetermined color are generated.

17. An information processing apparatus, comprising:
a processor programmed to
generate image data of a first form and one or more second forms, the image data of both the first form and the second form including respective code images which identify a job,
wherein generating image data of the first form comprises including generating a predetermined area having a predetermined color that is associated with one or more parts constituting a final product of the job identified by the first form, and
wherein generating image data of the one or more second forms comprises the one or more second forms inheriting the predetermined color of the predetermined area from the first form,
instruct a printer to print the first form using the image data of the first form, and to print the one or more second forms using the image data of the one or more second forms, and
manage the job identified by the first form and the one or more second forms by using the predetermined color of the predetermined area of the first form and the one or more second forms,
wherein
the job includes a printing process,
the final product of the job is a booklet;
the one or more parts constituting the final product are one or more printed materials constituting the booklet;
each of the first form and the one or more second forms is a work instruction sheet in which work processes or apparatuses for producing the booklet are described;
the first form is generated by assigning the predetermined color associated with each of the one or more printed materials constituting the booklet to the work instruction sheet; and
when a storage location of one of the printed materials is divided into multiple locations, a corresponding number of the second forms inheriting the predetermined color are generated.

* * * * *